US012757115B2

(12) United States Patent
Ryu et al.

(10) Patent No.: US 12,757,115 B2
(45) Date of Patent: Oct. 6, 2026

(54) SIGNALING FOR WAKEUP PROCEDURES

(71) Applicant: QUALCOMM Incorporated, San Diego, CA (US)

(72) Inventors: Jung Ho Ryu, Fort Lee, NJ (US); Kazuki Takeda, Tokyo (JP); Igor Gutman, Hod HaSharon (IL); Hemant Saggar, San Diego, CA (US); Jelena Damnjanovic, Del Mar, CA (US); Junyi Li, Greentown, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 264 days.

(21) Appl. No.: 18/665,667

(22) Filed: May 16, 2024

(65) Prior Publication Data

US 2025/0358736 A1 Nov. 20, 2025

(51) Int. Cl.
*H04W 52/02* (2009.01)
*H04W 8/24* (2009.01)

(52) U.S. Cl.
CPC ......... *H04W 52/0212* (2013.01); *H04W 8/24* (2013.01); *H04W 52/0235* (2013.01)

(58) Field of Classification Search
CPC ............... H04W 52/0212; H04W 8/24; H04W 52/0235; H04W 52/0216; H04W 52/0229; H04W 76/28; Y02D 30/70; H04L 5/0051; H04L 5/0094
See application file for complete search history.

(56) References Cited

U.S. PATENT DOCUMENTS

| | | | | |
|---|---|---|---|---|
| 2019/0090191 | A1 | 3/2019 | Liu et al. | |
| 2020/0145921 | A1 | 5/2020 | Zhang et al. | |
| 2024/0196328 | A1* | 6/2024 | He | H04W 52/0216 |
| 2025/0126563 | A1* | 4/2025 | Niu | H04W 52/0235 |
| 2025/0261120 | A1* | 8/2025 | Li | H04W 72/51 |
| 2026/0089638 | A1* | 3/2026 | Mazloum | H04W 52/0235 |

FOREIGN PATENT DOCUMENTS

| | | | |
|---|---|---|---|
| WO | 2024063832 | A1 | 3/2024 |
| WO | 2024077505 | A1 | 4/2024 |

OTHER PUBLICATIONS

International Search Report and Written Opinion—PCT/US2025/024240—ISA/EPO —Jul. 15, 2025.

* cited by examiner

*Primary Examiner* — Ricky Q Ngo
*Assistant Examiner* — Kabir U Jahangir
(74) *Attorney, Agent, or Firm* — Harrity & Harrity LLP/ QUALCOMM Incorporated

(57) ABSTRACT

Various aspects of the present disclosure generally relate to wireless communication. In some aspects, a user equipment (UE) may transmit, to a network node, capability information for a wakeup procedure associated with a main radio of the UE, the capability information being associated with at least one of one or more sleep modes supported by the UE or one or more wakeup modes supported by the UE. The UE may receive, from the network node, configuration information for the wakeup procedure, the configuration information being based on the capability information. Numerous other aspects are described.

20 Claims, 13 Drawing Sheets

SIGNALING FOR WAKEUP PROCEDURES

FIELD OF THE DISCLOSURE

Aspects of the present disclosure generally relate to wireless communication and specifically relate to techniques, apparatuses, and methods associated with signaling for wakeup procedures.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a user equipment (UE) for wireless communication. The user equipment may include one or more memories and one or more processors coupled to the one or more memories. The one or more processors may be configured to cause the UE to transmit, to a network node, capability information for a wakeup procedure associated with a main radio of the UE, the capability information being associated with at least one of one or more sleep modes supported by the UE or one or more wakeup modes supported by the UE. The one or more processors may be configured to cause the UE to receive, from the network node, configuration information for the wakeup procedure, the configuration information being based on the capability information.

Some aspects described herein relate to a method of wireless communication performed by a UE. The method may include transmitting, to a network node, capability information for a wakeup procedure associated with a main radio of the UE, the capability information being associated with at least one of one or more sleep modes supported by the UE or one or more wakeup modes supported by the UE. The method may include receiving, from the network node, configuration information for the wakeup procedure, the configuration information being based on the capability information.

Some aspects described herein relate to a non-transitory computer-readable medium that stores a set of instructions for wireless communication by a UE. The set of instructions, when executed by one or more processors of the UE, may cause the UE to transmit, to a network node, capability information for a wakeup procedure associated with a main radio of the UE, the capability information being associated with at least one of one or more sleep modes supported by the UE or one or more wakeup modes supported by the UE. The set of instructions, when executed by one or more processors of the UE, may cause the UE to receive, from the network node, configuration information for the wakeup procedure, the configuration information being based on the capability information.

Some aspects described herein relate to an apparatus for wireless communication. The apparatus may include means for transmitting, to a network node, capability information for a wakeup procedure associated with a main radio of the apparatus, the capability information being associated with at least one of one or more sleep modes supported by the apparatus or one or more wakeup modes supported by the apparatus. The apparatus may include means for receiving, from the network node, configuration information for the wakeup procedure, the configuration information being based on the capability information.

Some aspects described herein relate to a network node for wireless communication. The network node may include one or more memories and one or more processors coupled to the one or more memories. The one or more processors may be configured to receive capability information of a UE for a wakeup procedure associated with a main radio of the UE, the capability information being associated with at least one of one or more sleep modes supported by the UE or one or more wakeup modes supported by the UE. The one or more processors may be configured to transmit configuration information for the UE for the wakeup procedure, the configuration information being based on the capability information.

Some aspects described herein relate to a method of wireless communication performed by a network node. The method may include receiving capability information of a UE for a wakeup procedure associated with a main radio of the UE, the capability information being associated with at least one of one or more sleep modes supported by the UE or one or more wakeup modes supported by the UE. The method may include transmitting configuration information for the UE for the wakeup procedure, the configuration information being based on the capability information.

Some aspects described herein relate to a non-transitory computer-readable medium that stores a set of instructions for wireless communication by a network node. The set of instructions, when executed by one or more processors of the network node, may cause the network node to receive capability information of a UE for a wakeup procedure associated with a main radio of the UE, the capability information being associated with at least one of one or more sleep modes supported by the UE or one or more wakeup modes supported by the UE. The set of instructions, when executed by one or more processors of the network node, may cause the network node to transmit configuration information for the UE for the wakeup procedure, the configuration information being based on the capability information.

Some aspects described herein relate to an apparatus for wireless communication. The apparatus may include means for receiving capability information of a UE for a wakeup procedure associated with a main radio of the UE, the capability information being associated with at least one of one or more sleep modes supported by the UE or one or more wakeup modes supported by the UE. The apparatus may include means for transmitting configuration information for the UE for the wakeup procedure, the configuration information being based on the capability information.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

DETAILED DESCRIPTION

Figure 1:
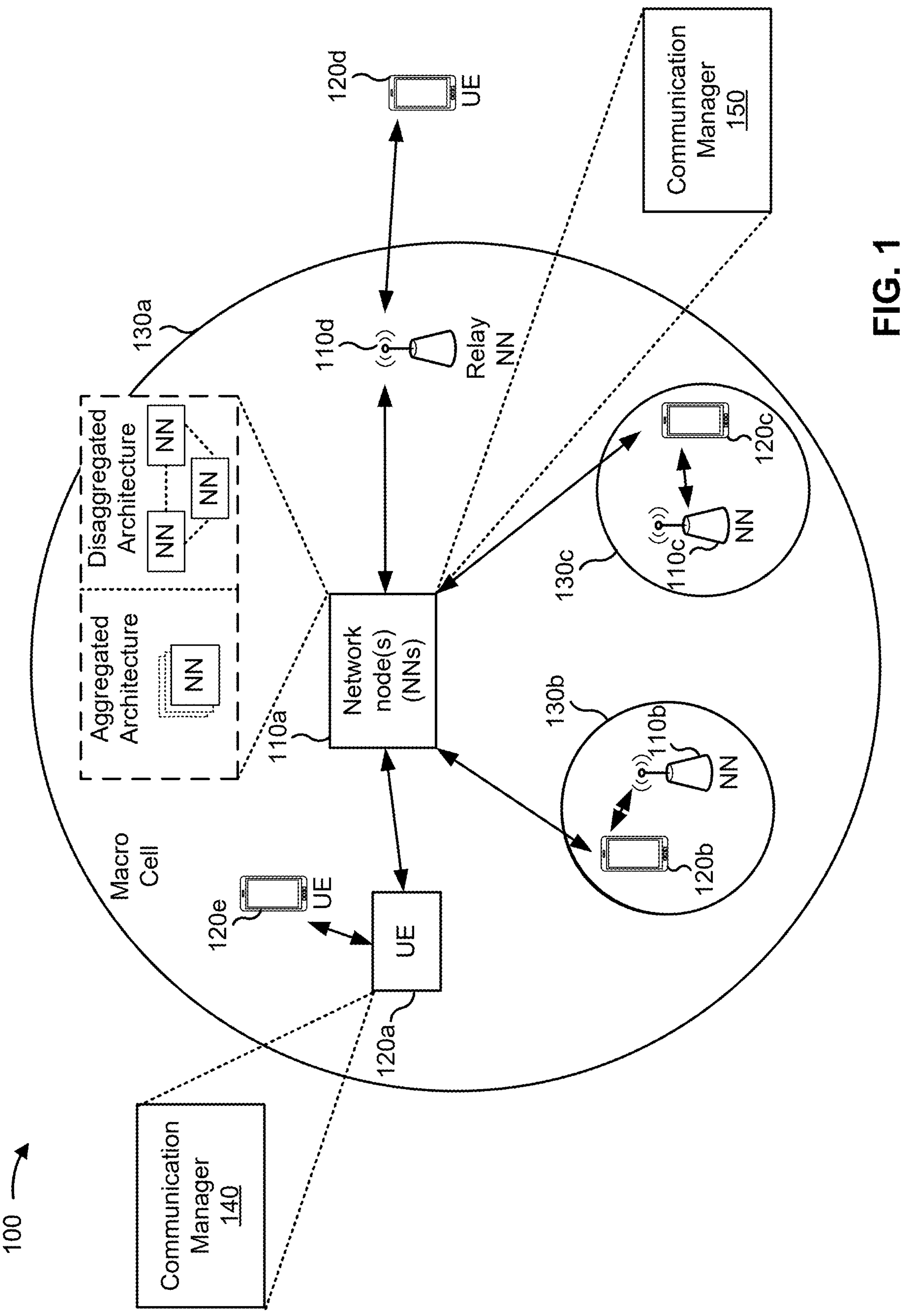
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication system may provide for communication between network nodes and user equipments (UEs). These communications may consume some amount of power. For example, a UE may consume a lower amount of power while in a low power state (such as while not connected to a network or while waiting for paging from the network), and may consume a higher amount of power while in a full power state (such as while actively communicating with a network node or while monitoring for control information from the network). Certain components of the UE may consume a significant amount of power. For example, a main radio of the UE, which may support bidirectional communication (such as both transmission and reception), multi-layer communication, or larger bandwidths (such as a communication bandwidth of the UE), may consume power while active, such as in the course of communicating or monitoring for control information.

Some techniques provide power savings at the UE by limiting the amount or ratio of time in which the main radio is active, relative to the amount of time in which the main radio is inactive or powered down. For example, a discontinuous reception (DRX) cycle may provide off durations (sometimes referred to as inactive times, or sleep durations) in which the main radio is inactive, and on durations in which the main radio is active. The UE (using the main radio) may monitor for a paging physical downlink control channel (PDCCH) during the on duration, and may extend the on duration if a paging PDCCH is received, which facilitates further communication in accordance with the paging PDCCH. Thus, power consumption of the main radio may be reduced by reducing the amount of time in which the main radio is active and/or monitoring for a paging PDCCH.

While the DRX cycle reduces power consumption at the UE and the network, further power savings may be desirable, particularly in 5G, 6G, and similar radio access technologies (RATs) where beamforming and high-frequency communication cause increased power consumption relative to other RATs. To achieve further power savings, a UE may include or be associated with a low-power wakeup radio (LP-WUR). The LP-WUR may consume less power than the main radio. The LP-WUR may facilitate indication, from the network, for the UE to exit a low power state, such as by waking up the main radio. For example, while the main radio is in a low power state, the LP-WUR may receive a signal referred to as a low-power wakeup signal (LP-WUS), and may trigger the main radio to exit the low power state. Notably, the LP-WUS/LP-WUR can be implemented in conjunction with a DRX cycle, such that the main radio may skip an on duration if the LP-WUR has not received an LP-WUS in association with (e.g., before) the on duration, thereby further reducing power consumption relative to waking up in an on duration in which the UE will not receive a paging PDCCH. In some examples, the network node may transmit a low-power synchronization signal (LP-SS), which may facilitate synchronization by the UE using the LP-WUR, thereby mitigating the effects of clock and/or frequency drift in periods of inactivity.

In some examples, the UE may support different (e.g., multiple) sleep modes and/or different (e.g., multiple) wakeup modes. As used herein, "sleep" mode may refer to an operational mode of the main radio of the UE in which the main radio is inactive, not performing communication operations (e.g., not transmitting and/or receiving signals), and/or otherwise in a sleep state. As used herein, "wakeup" mode may refer to an operational mode of the main radio of the UE in which the main radio is functional, is powered on, is performing communication operations (e.g., is transmitting and/or receiving signals), and/or otherwise in an active state. For example, "wakeup" mode may refer to an operational mode in which the main radio is configured to receive and/or transmit signals, and "sleep" mode may refer to an operational mode in which the main radio is not configured to receive and/or transmit signals.

The different sleep modes may be associated with respective energy consumption levels by the main radio. As another example, the different sleep modes may be associated with respective levels of functionality and/or respective operational components (e.g., different components or functionality may be operational or available by the main radio for different sleep modes). For example, the different sleep modes may include an ultra-deep sleep mode, a deep sleep mode, a light sleep mode, and/or a micro sleep mode, among other examples. Different sleep modes have different power saving advantages (e.g., the main radio may consume less power in the ultra-deep sleep as compared to the micro sleep mode). In general, the greater the power saving for a given sleep mode, the longer the UE takes to switch on the main radio (e.g., the longer the delay associated with the main radio wakeup time). For example, in the deep sleep mode, an RF and/or modem components of the main radio may be power off. In the light slight mode, some clocks of the main radio may remain on and/or functioning, thereby reducing the amount of time associated with transitioning the main radio to a wakeup mode (e.g., to an active mode).

Additionally, the UE may support different (e.g., multiple) wakeup modes. In some examples, the different (e.g., multiple) wakeup modes may be associated with respective levels of functionality. For example, in a first wakeup mode (e.g., a high quality mode, a high performance mode, or a high sensitivity mode), the main radio may be capable of receiving any type of signal from a network node. In a second wakeup mode (e.g., a low quality mode, a low performance mode, or a low sensitivity mode), the main radio may only be capable of receiving some types of signals from the network node, such as simple or low-complexity signals (e.g., downlink control information (DCI), such as DCI indicating PDCCH monitoring adaptation, such as PDCCH skipping). The second wakeup mode may be associated with a lower power consumption by the main radio as compared to the first wakeup mode. However, the UE may be unable to receive and/or decode some signals when operating in the second wakeup mode.

As a result, because the UE may support and/or operate in different sleep modes and/or different wakeup modes, a performance of the wakeup procedure or operation may be degraded. For example, the network node may be unaware of which sleep mode the UE is operating in. Therefore, the network node may be unaware of a duration of the delay associated with transitioning the main radio to a wakeup mode to monitor the PDCCH. As a result, the network node may transmit a communication (e.g., DCI) for the UE before the UE has had an opportunity to transition the main radio to the wakeup mode. This may result in the UE missing or failing to receive the communication. As another example, the network node may delay the transmission of the signal to allow the UE to transition the main radio to the wakeup mode (e.g., where the delay is based on the largest delay for supported sleep modes). If the main radio is operating in a sleep mode associated with a delay that is less than the largest delay, then this may result in the main radio operating in the wakeup mode for more time than is needed to receive the communication(s) from the network node, thereby needlessly consuming additional power.

Further, the network node may be unaware of the wakeup mode in which the main radio is operating. As a result, the network node may transmit a communication to the UE which cannot be received or decoded by the main radio in the wakeup mode. This may result in the UE missing or failing to receive the communication.

Various aspects relate generally to signaling for a wakeup procedure. Some aspects more specifically relate to a UE transmitting capability information for the wakeup procedure. A network node may configure the UE to perform the wakeup procedure in accordance with the capability information. In some aspects, the capability information may be associated with one of one or more sleep modes supported by the UE and/or one or more wakeup modes supported by the UE. For example, the capability information may indicate one or more supported modes (e.g., one or more supported sleep modes and/or one or more supported wakeup modes). As another example, the capability information may indicate one or more delays (e.g., main radio wakeup delays) associated with respective supported modes (e.g., one or more supported sleep modes and/or one or more supported wakeup modes).

The network node may configure the UE to perform the wakeup procedure in accordance with the capability information. For example, the network node may configure the UE to operate in a sleep mode (from the one or more sleep modes indicated by the capability information) and/or in a wakeup mode (e.g., from the one or more wakeup modes indicated by the capability information) for the wakeup procedure. In some example, the network node may configure one or more modes (e.g., in accordance with or based on the capability information) for the UE and may indicate which mode (e.g., a sleep mode or a wakeup mode) the UE is to operate in via an LP-WUS. For example, the LP-WUS may include an indication (e.g., one or more bits indicating) the mode. As another example, the monitoring occasion in which the LP-WUS is received by the UE may be associated with the mode via the configuration information. For example, the configuration information may configure one or more monitoring occasions for respective modes (e.g., a sleep mode or a wakeup mode) supported by the UE. The network node may transmit an LP-WUS via a monitoring occasion that is associated with the mode in which the network node intends for the UE to operate in.

Particular aspects of the subject matter described in this disclosure can be implemented to realize one or more of the following potential advantages. In some examples, by exchanging the capability information and the configuration information, the described techniques can be used to synchronize and coordinate the operations of the UE for the wakeup procedure. This may enable the UE to operate in different sleep modes and/or different wakeup modes without degrading communication performance or increasing latency for communications with the network. By enabling the UE to operate in different sleep modes and/or different wakeup modes, the described techniques can be used to provide flexibility for the UE and/or a network node to adapt the power saving operations of the UE to different situations, thereby improving the power usage efficiency of the UE while also not degrading communication performance or increasing latency for communications with the network.

Additionally, by configuring one or more modes (e.g., in accordance with or based on the capability information) for the UE and indicating which mode (e.g., a sleep mode or a wakeup mode) the UE is to operate in via an LP-WUS, the described techniques can be used to reducing a singling overhead and/or delay associated with the UE switching between different sleep modes and/or different wakeup modes. For example, rather than reconfiguring the monitoring occasions and/or wakeup procedure for the UE, the network node may cause the UE to switch between different sleep modes and/or different wakeup modes via an LP-WUS transmission, thereby conserving signaling overhead and/or reducing latency that would have otherwise been associated with reconfiguring the monitoring occasions and/or wakeup procedure for the UE to cause the UE to switch between the different sleep modes and/or different wakeup modes (e.g., because the reconfiguration may include one or more radio resource control (RRC) communications which are associated with longer delays as compared to lower-layer signaling, such as LP-WUS signaling).

Multiple-access RATs have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110, shown as a network node (NN) 110*a*, a network node 110*b*, a network node 110*c*, and a network node 110*d*. The network nodes 110 may support communications with multiple UEs 120, shown as a UE 120*a*, a UE 120*b*, a UE 120*c*, a UE 120*d*, and a UE 120*e*.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHZ), FR3 (7.125 GHz through 24.25 GHZ), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHZ, FR1 is often referred to (interchangeably) as a "Sub-6 GHZ" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/Long Term Evolution (LTE) and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as RRC functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110*a* may be a macro network node for a macro cell 130*a*, the network node 110*b* may be a pico network node for a pico cell 130*b*, and the network node 110*c* may be a femto network node for a femto cell 130*c*. Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit DCI (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more PDCCHs, and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, Institute of Electrical and Electronics Engineers (IEEE) compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, May include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered Customer Premises Equipment, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120*a* and UE 120*e*) may communicate directly with one another using sidelink communications (for example, without communicating by way of a network node 110 as an intermediary). As an example, the UE 120*a* may directly transmit data, control information, or other signaling as a sidelink communication to the UE 120*e*. This is in contrast to, for example, the UE 120*a* first transmitting data in an UL communication to a network node 110, which then transmits the data to the UE 120*e* in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, the UE 120 may include a communication manager 140. As described in more detail elsewhere herein, the communication manager 140 may transmit, to a network node, capability information for a wakeup procedure associated with a main radio of the UE, the capability information being associated with at least one of one or more sleep modes supported by the UE or one or more wakeup modes supported by the UE; and receive, from the network node, configuration information for the wakeup procedure, the configuration information being based on the capability information. Additionally, or alternatively, the communication manager 140 may perform one or more other operations described herein.

In some aspects, the network node 110 may include a communication manager 150. As described in more detail elsewhere herein, the communication manager 150 may receive capability information of a UE for a wakeup procedure associated with a main radio of the UE, the capability information being associated with at least one of one or more sleep modes supported by the UE or one or more wakeup modes supported by the UE; and transmit configuration information for the UE for the wakeup procedure, the configuration information being based on the capability information. Additionally, or alternatively, the communication manager 150 may perform one or more other operations described herein.

As indicated above, FIG. 1 is provided as an example. Other examples may differ from what is described with regard to FIG. 1.

Figure 2:
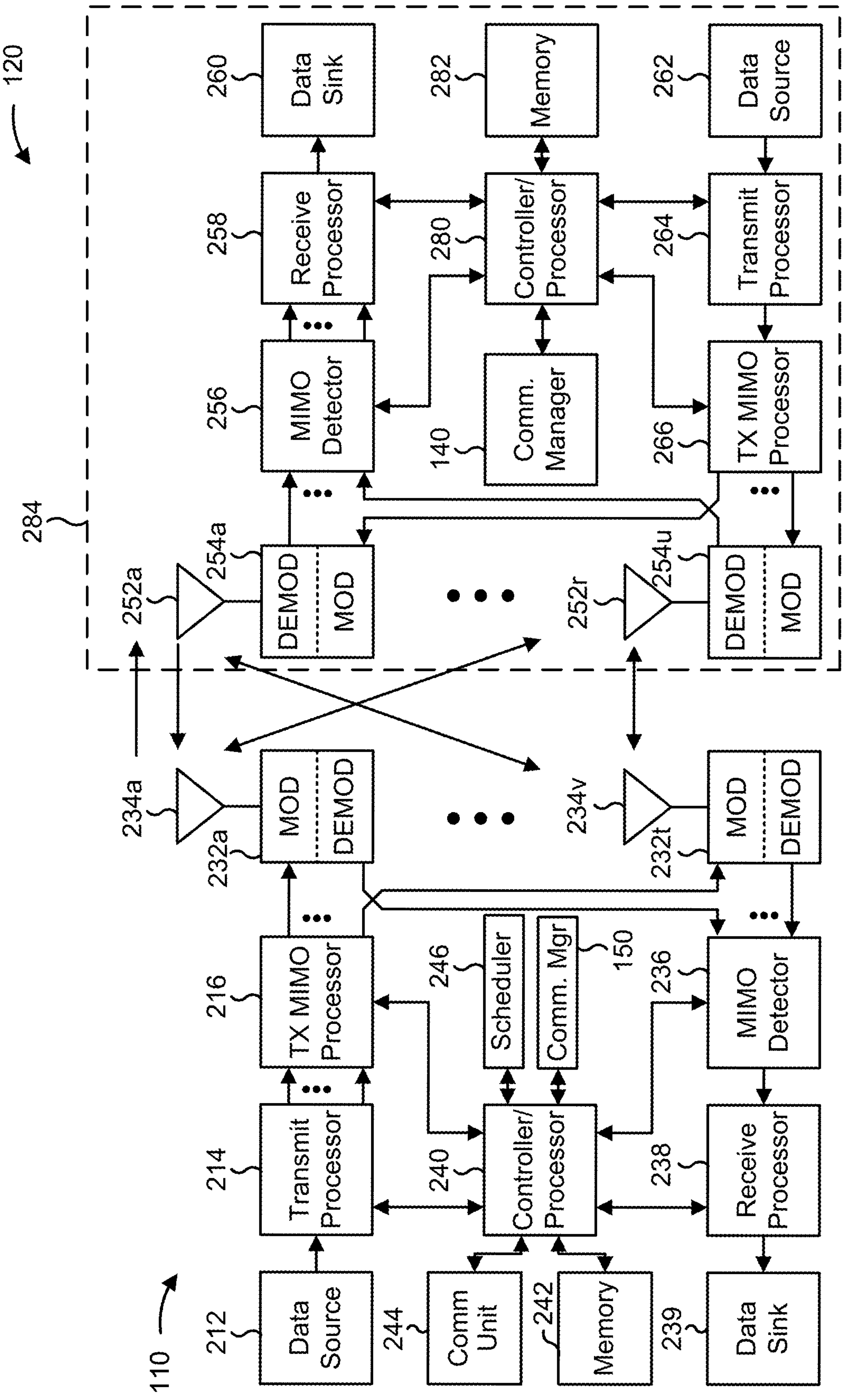
FIG. 2 is a diagram illustrating an example network node in communication with an example user equipment (UE) in a wireless network, in accordance with the present disclosure.

FIG. 2 is a diagram illustrating an example network node 110 in communication with an example UE 120 in a wireless network, in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more modulation and coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232*a* through 232*t* may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252*a* through 252*r*, where r≥1), a set of modems 254 (shown as modems 254*a* through 254*u*, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254*a* through 254*u* may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
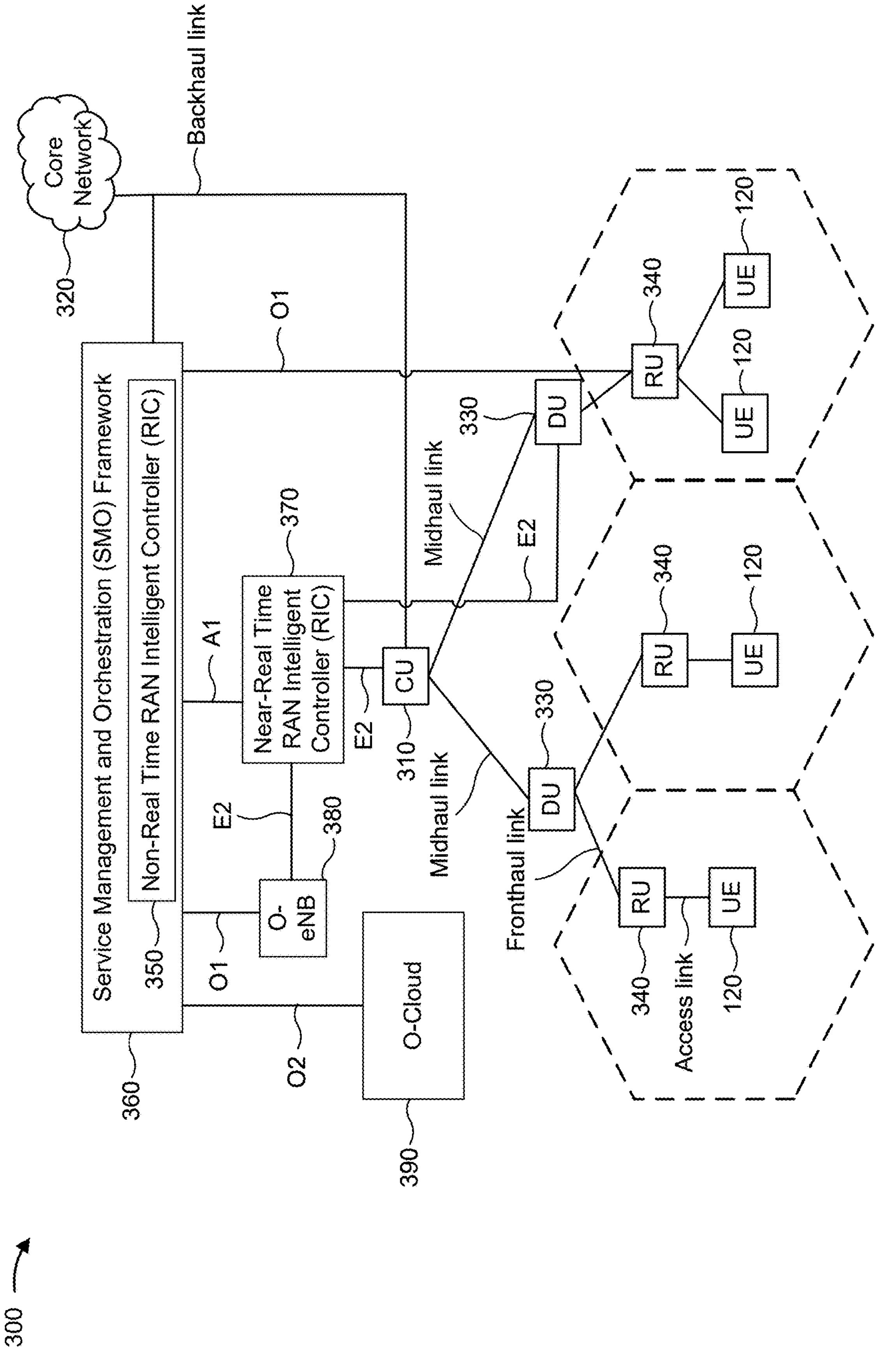
FIG. 3 is a diagram illustrating an example disaggregated base station architecture, in accordance with the present disclosure.

FIG. 3 is a diagram illustrating an example disaggregated base station architecture 300, in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with signaling for wakeup procedures, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 1000 of FIG. 10, process 1100 of FIG. 11, or other processes as described herein (alone or in conjunction with one or more other processors). The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 1000 of FIG. 10, process 1100 of FIG. 11, or other processes as described herein. In some examples, executing instructions may include running the instructions, converting the instructions, compiling the instructions, and/or interpreting the instructions, among other examples.

In some aspects, the UE 120 includes means for transmitting, to a network node, capability information for a wakeup procedure associated with a main radio of the UE, the capability information being associated with at least one of one or more sleep modes supported by the UE or one or more wakeup modes supported by the UE (e.g., using one or more of communication manager 140, antenna 252, modem 254, transmit processor 264, TX MIMO processor 266, controller/processor 280, or memory 282); and/or means for receiving, from the network node, configuration information for the wakeup procedure, the configuration information being based on the capability information (e.g., using one or more of communication manager 140, antenna 252, modem 254, MIMO detector 256, receive processor 258, controller/processor 280, or memory 282). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for receiving capability information of a UE for a wakeup procedure associated with a main radio of the UE, the capability information being associated with at least one of one or more sleep modes supported by the UE or one or more wakeup modes supported by the UE (e.g., using one or more of communication manager 150, modem 232, antenna 234, MIMO detector 236, receive processor 238, controller/ processor 240, memory 242, or scheduler 246); and/or means for transmitting configuration information for the UE for the wakeup procedure, the configuration information being based on the capability information (e.g., using one or more of communication manager 150, transmit processor 214, TX MIMO processor 216, modem 232, antenna 234, controller/processor 240, memory 242, or scheduler 246). The means for the network node 110 to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4:
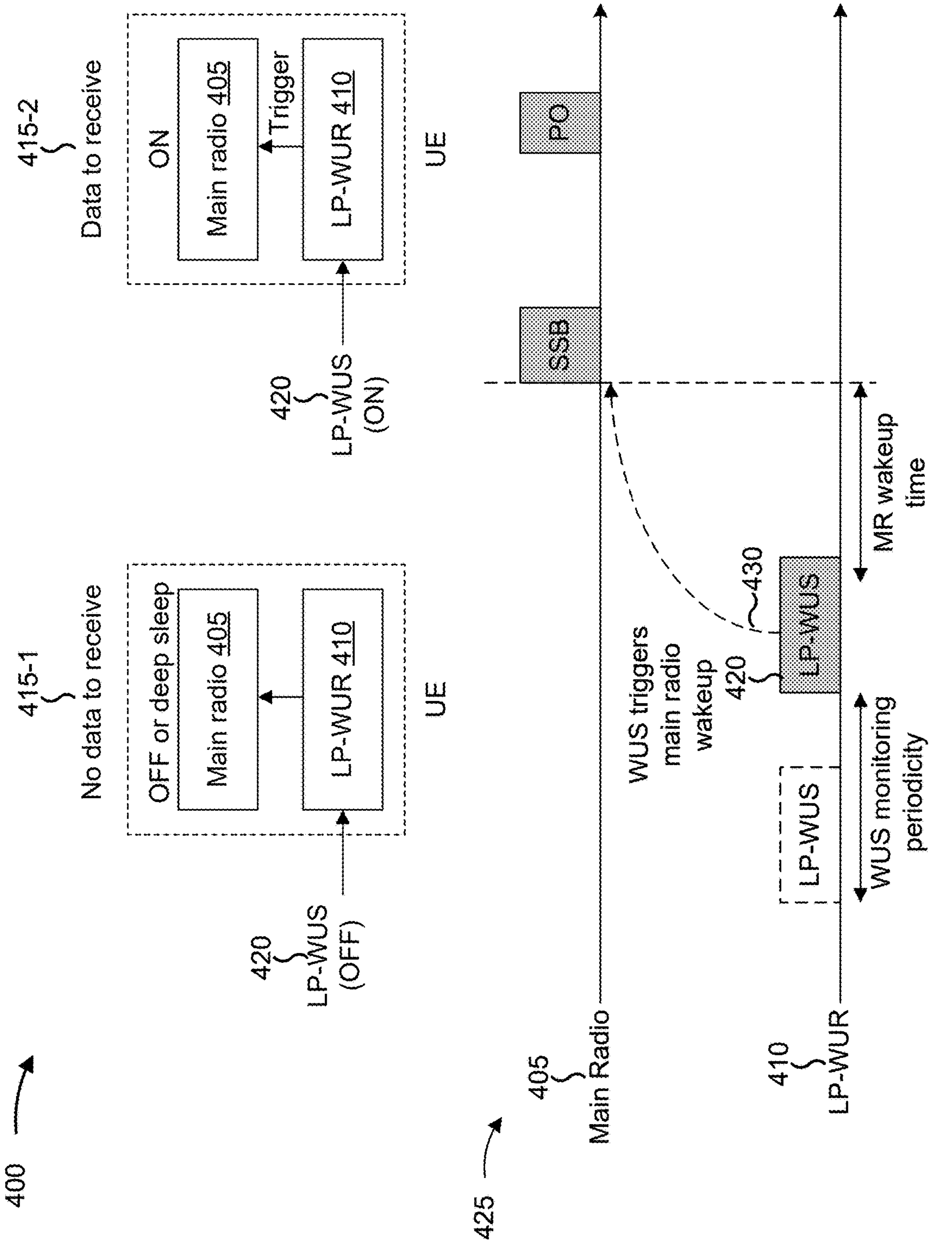
FIG. 4 is a diagram illustrating an example of a low-power wakeup radio (LP-WUR) and a low-power wakeup signal, in accordance with the present disclosure.

FIG. 4 is a diagram illustrating an example 400 of an LP-WUR and an LP-WUS, in accordance with the present disclosure. As shown in FIG. 4, a UE (such as UE 120) may be equipped with a communication system that includes a main radio (illustrated as "MR") 405 and an LP-WUR 410 to reduce power consumption and enable low latency. For example, power saving and low latency are often conflicting goals because placing one or more components into a sleep state more often to reduce power consumption also increases latency (e.g., because data cannot be transmitted and/or received while the one or more components are in the sleep state), and because reducing the time that one or more components spend in a sleep state to reduce latency can lead to increased power consumption. Accordingly, as shown in FIG. 4, the UE may be equipped with the LP-WUR 410, which may be considered a companion receiver that can be used with a main radio 405 to reduce power consumption and latency. The LP-WUR 410 may be referred to herein as a "low-power radio" of the UE.

For example, in some examples, the UE may generally use the main radio 405 to transmit and/or receive user data, and the main radio 405 may be turned off or operated in a deep sleep state unless there is user data to transmit and/or receive. Furthermore, the LP-WUR 410 may serve as a simple wakeup receiver for the main radio 405, and the LP-WUR 410 may be active and monitoring for an LP-WUS while the main radio 405 is off or in the deep sleep state. For example, reference number 415-1 depicts a first state associated with the main radio 405 and the LP-WUR 410 where there is no user data to be provided to the main radio 405. In such examples, the main radio 405 may be off or operated in the deep sleep state unless there is user data to transmit, and the LP-WUR 410 may monitor for an LP-WUS (for example, continuously, or periodically in monitoring occasions that are separated in time). Furthermore, reference number 415-2 depicts a second state associated with the main radio 405 and the LP-WUR 410 where there is user data for the main radio 405. In such examples, the LP-WUR 410 may receive an LP-WUS 420 (such as from a network node 110) and may provide a trigger to wake or otherwise activate the main radio 405 based on detecting the LP-WUS 420. Accordingly, the main radio 405 may then transmit and/or receive user data.

In general, the LP-WUR 410 may consume relatively little power (for example a target power consumption less than 100 microwatts (μW) in the active state), which may be achieved using simple modulation schemes (for example, on-off keying (OOK)), a narrow bandwidth (for example, less than 5 MHz), and/or other suitable techniques. In this way, the LP-WUR 410 can be used to reduce the time that the main radio 405 spends in an on state and/or may avoid unnecessarily waking the main radio 405 from the off or deep sleep state when there is no user data to transmit or receive, which tends to be costly from a power consumption perspective. Furthermore, because the LP-WUR 410 has a low power consumption, the LP-WUR 410 can be used to frequently or continuously perform LP-WUS monitoring, which may improve latency because the main radio 405 can be woken up when there is user data that the main radio 405 needs to receive. For example, the LP-WUR 410 may not suffer from the latency versus power efficiency tradeoff associated with duty cycling schemes, such as DRX. Furthermore, in addition to performing LP-WUS monitoring, which may be used for paging reception, the LP-WUR 410 may monitor for a LP-SS for time and frequency tracking and radio resource management (RRM) measurement. In this way, by monitoring the LP-SS, serving cell and/or neighbor cell monitoring can be offloaded from the main radio 405 to the LP-WUR 410 to reduce how often the main radio 405 is woken up, which can further reduce power consumption.

In some examples, the LP-WUR 410 may include an OOK WUR (also referred to as an envelope detector (ED) WUR). An OOK WUR may only detect the amplitude (such as the magnitude) of a received signal. A UE that uses an OOK WUR may detect the phase of a received signal by activating the main radio 405. In some examples, the LP-WUR 410 may include an OFDM WUR (which may be referred to as an in-phase and quadrature (IQ) WUR). An OFDM WUR can detect both the amplitude and phase of a received signal. For example, an OFDM WUR can obtain first information that is modulated onto a signal using OOK modulation, and second information that is modulated onto the signal using phase modulation.

In some examples, as shown by reference number 425, one application of the LP-WUR 410 may be to monitor the LP-WUS 420 for paging monitoring, which can be used to reduce unnecessary paging reception performed by the main radio 405. For example, as shown in FIG. 4, the LP-WUR 410 may be configured to monitor for an LP-WUS 420 (while the main radio 405 is off or in a deep sleep state or other sleep mode) according to a WUS monitoring periodicity. For example, the LP-WUR 410 may monitor for the LP-WUS 420 in periodic LP-WUS monitoring occasions that are spaced in time according to the WUS monitoring periodicity. Alternatively, although not explicitly shown in FIG. 4, the LP-WUR 410 may be configured to continuously monitor for the LP-WUS 420. In general, a network node may transmit an LP-WUS 420 to a UE only in cases where there is a paging message that needs to be sent to the UE while the UE is in an idle or inactive state (such as an RRC idle or RRC inactive state). In such examples, as shown by reference number 430, the LP-WUR 410 may receive and detect the LP-WUS 420, which may trigger the LP-WUR 410 to wake up the main radio 405. In some examples, the LP-WUS 420 may be a sequence-based WUS, which may include a predefined set of sequences (implemented, for example, using OOK modulation and/or phase modulation). As shown, the main radio 405 may wake up after a main radio wakeup time, and may then start to monitor one or more synchronization signal block (SSB) transmissions to obtain synchronization with the network node before monitoring and receiving the paging message in a subsequent paging occasion (PO). Otherwise, in examples where the LP-WUR 410 does not detect the LP-WUS 420, the main radio 405 may remain in the deep sleep state or other sleep mode to save power.

As indicated above, FIG. 4 is provided as an example. Other examples may differ from what is described with regard to FIG. 4.

Figure 5:
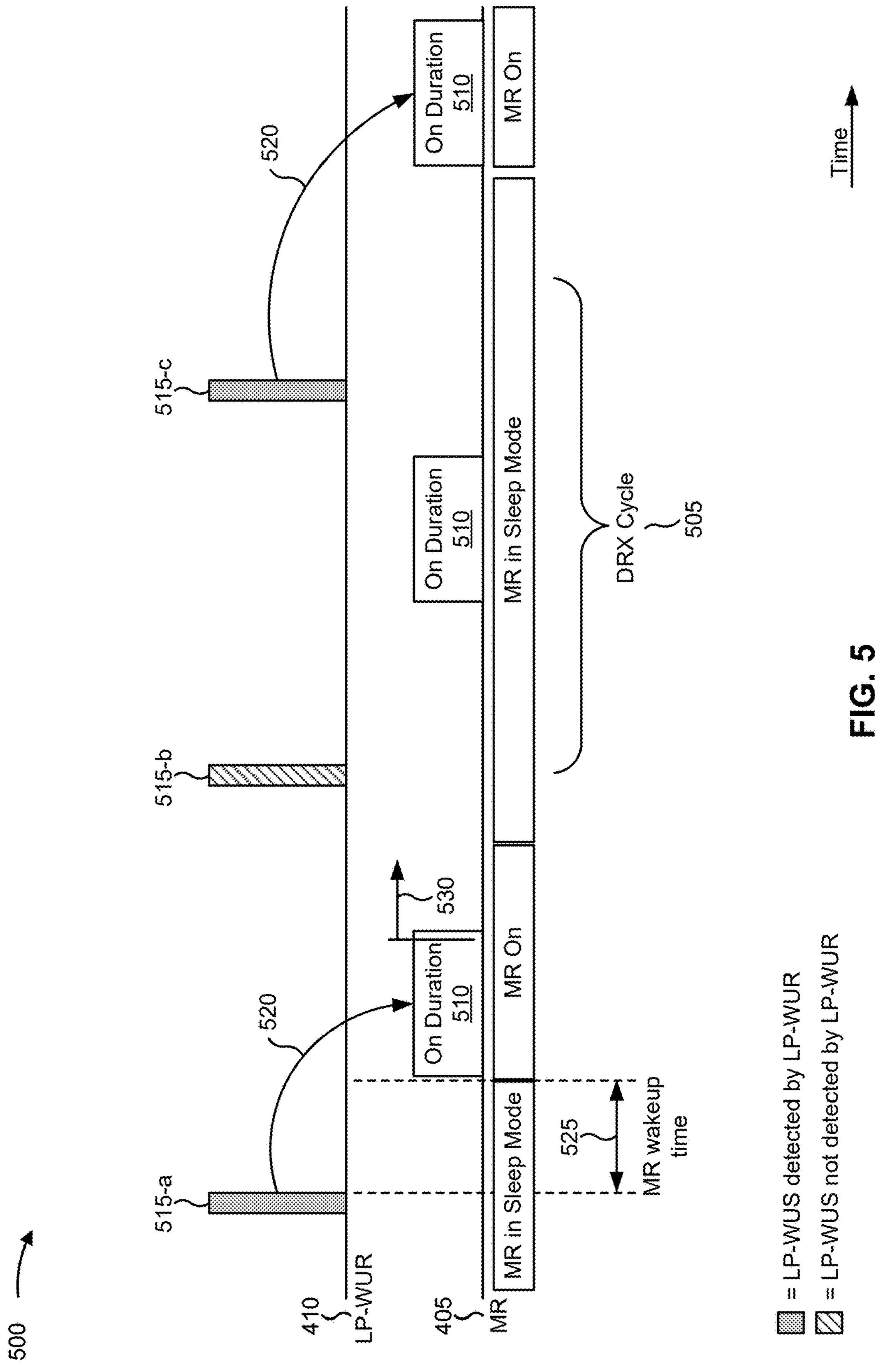
FIG. 5 is a diagram illustrating an example of a discontinuous reception cycle using an LP-WUR and a main radio of a UE, in accordance with the present disclosure.

FIG. 5 is a diagram illustrating an example 500 of a DRX cycle using an LP-WUR 410 and a main radio 405 of a UE, in accordance with the present disclosure. As shown in FIG. 5, the main radio 405 may operate in a sleep mode, such as low power state or a powered down state (shown in FIG. 5 as "MR in Sleep Mode"). The main radio may operate in the sleep mode during off durations, which may be defined by a DRX cycle. For example, the UE may receive a DRX configuration which may configure one or more DRX cycles 505. A DRX cycle 505 may include a DRX on duration 510 (e.g., during which a UE 120, such as the main radio 405, may be awake or in an active state) and an opportunity to enter a DRX sleep state. As used herein, the time during which the UE 120 is configured to be in an active state during the DRX on duration 510 may be referred to as an active time, and the time during which the UE 120 is configured to be in the DRX sleep state may be referred to as an inactive time. As described below, the UE 120 may monitor a PDCCH during the active time, and may refrain from monitoring the PDCCH during the inactive time.

If the main radio 405 is triggered to wake up during an on duration 510 (e.g., the active time), then the UE 120 may monitor a downlink control channel (e.g., a PDCCH) via the main radio 405. For example, the UE 120 (e.g., via the main radio 405) may monitor the PDCCH for DCI pertaining to the UE 120. If the UE 120 does not detect and/or successfully decode any PDCCH communications intended for the UE 120 during the on duration 510, then the UE 120 may enter the sleep state (e.g., for the inactive time) at the end of the DRX on duration (e.g., the main radio 405 may transition to operating in a sleep mode). In this way, the UE 120 may conserve battery power and reduce power consumption.

As shown in FIG. 5, a network node may configure the UE to perform a wakeup operation for downlink control channel (e.g., PDCCH) monitoring. The wakeup operation may refer to the UE being configured to "wake up" the main radio 405 to monitor the PDCCH during an on duration 510 based on, in response to, and/or only if the UE receives and/or detects a wakeup signal (e.g., an LP-WUS) via the LP-WUR 410. For example, the network node may configure one or more monitoring occasions 515 (shown in FIG. 5 as monitoring occasion 515-*a*, monitoring occasion 515-*b*, and monitoring occasion 515-*c*) to be used by the UE to monitor for LP-WUSs. As used herein, "monitoring occasion" may refer to one or more time domain resources and/or one or more frequency domain resources.

As shown in FIG. 5, the UE may monitor for LP-WUSs via the LP-WUR 410 during the one or more monitoring occasions 515. If the UE detects an LP-WUS (such as in the monitoring occasion 515-*a* or the monitoring occasion 515-*c*), then the UE May cause or trigger the main radio to transition from operating the sleep mode to operating in a wakeup mode (e.g., shown as "MR On" in FIG. 5), as shown by reference number 520. This may cause the main radio 405 to transition to an active or operational state to enable the UE to monitor the PDCCH during an on duration 510 via the main radio 405. As shown by reference number 525, there may be a delay (e.g., the main radio wakeup time) associated with the main radio 405 transitioning from operating the sleep mode to operating in the wakeup mode (e.g., in an active mode). The UE may monitor the PDCCH during a next on duration 510 after causing the main radio 405 to operate in the wakeup mode.

In some examples, if the UE 120 detects and/or successfully decodes a PDCCH communication intended for the UE 120, then the UE 120 may remain in an active state (e.g., awake) for the duration of a DRX inactivity timer 530 (e.g., which may extend the active time). This may extend the amount of time that the main radio 405 is operating in the wakeup mode. The UE 120 may start the DRX inactivity timer 530 at a time at which the PDCCH communication is received (e.g., in a transmission time interval (TTI) in which the PDCCH communication is received, such as a slot or a subframe). The UE 120 may remain in the active state until the DRX inactivity timer 530 expires, at which time the UE 120 may cause the main radio 405 to transition to operating in the sleep mode. During the duration of the DRX inactivity timer 530, the UE 120 may continue to monitor for PDCCH communications via the main radio 405, may obtain a downlink data communication (e.g., on a downlink data channel, such as a PDSCH) scheduled by the PDCCH communication, and/or may prepare and/or transmit an uplink communication (e.g., on a physical uplink shared channel (PUSCH)) scheduled by the PDCCH communication.

In some other examples, the UE may not detect an LP-WUS during a monitoring occasion 515, such as the monitoring occasion 515-*b*. For example, the LP-WUR 410 may fail to receive an LP-WUS prior to an on duration 510. Therefore, the main radio 405 may skip the next on duration 510, and may remain in the sleep mode, thereby conserving power.

In some examples, the UE may support different (e.g., multiple) sleep modes and/or different (e.g., multiple) wakeup modes. For example, the different sleep modes may be associated with respective energy consumption levels by the main radio 405. As another example, the different sleep modes may be associated with respective levels of functionality and/or respective operational components (e.g., different components or functionality may be operational or available by the main radio 405 for different sleep modes). For example, the different sleep modes may include an ultra-deep sleep mode, a deep sleep mode, a light sleep mode, and/or a micro sleep mode, among other examples. Different sleep modes have different power saving advantages (e.g., the main radio 405 may consume less power in the ultra-deep sleep as compared to the micro sleep mode). In general, the greater the power saving for a given sleep mode, the longer the UE takes to switch on the main radio 405 (e.g., the longer the delay associated with the main radio wakeup time). For example, in the deep sleep mode, an RF and/or modem components of the main radio 405 may be power off. In the light slight mode, some clocks of the main radio 405 may remain on and/or functioning, thereby reducing the amount of time associated with transitioning the main radio 405 to a wakeup mode (e.g., to an active mode).

Additionally, the UE may support different (e.g., multiple) wakeup modes. "Wakeup" mode may refer to an operational mode in which the main radio 405 is capable of receiving and/or transmitting signals. In some examples, the different (e.g., multiple) wakeup modes may be associated with respective levels of functionality. For example, in a first wakeup mode (e.g., a high quality mode), the main radio 405 may be capable of receiving any type of signal from a network node. In a second wakeup mode (e.g., a low quality mode), the main radio 405 may only be capable of receiving some types of signals from the network node, such as simple or low-complexity signals (e.g., DCI, such as DCI indicating PDCCH monitoring adaptation, such as PDCCH skipping). The second wakeup mode may be associated with a lower power consumption by the main radio 405 as compared to the first wakeup mode. However, the UE may be unable to receive and/or decode some signals when operating in the second wakeup mode.

As a result, because the UE may support and/or operate in different sleep modes and/or different wakeup modes, a performance of the wakeup procedure or operation may be degraded. For example, the network node may be unaware of which sleep mode the UE is operating in. Therefore, the network node may be unaware of a duration of the delay associated with transitioning the main radio 405 to a wakeup mode to monitor the PDCCH. As a result, the network node may transmit a communication (e.g., DCI) for the UE before the UE has had an opportunity to transition the main radio 405 to the wakeup mode. This may result in the UE missing or failing to receive the communication. As another example, the network node may delay the transmission of the signal to allow the UE to transition the main radio 405 to the wakeup mode (e.g., where the delay is based on the largest delay for supported sleep modes). If the main radio 405 is operating in a sleep mode associated with a delay that is less than the largest delay, then this may result in the main radio 405 operating in the wakeup mode for more time than is needed to receive the communication(s) from the network node, thereby needlessly consuming additional power.

Further, the network node may be unaware of the wakeup mode in which the main radio 405 is operating. As a result, the network node may transmit a communication to the UE which cannot be received or decoded by the main radio in the wakeup mode. This may result in the UE missing or failing to receive the communication.

As indicated above, FIG. 5 is provided as an example. Other examples may differ from what is described with regard to FIG. 5.

Figure 6:
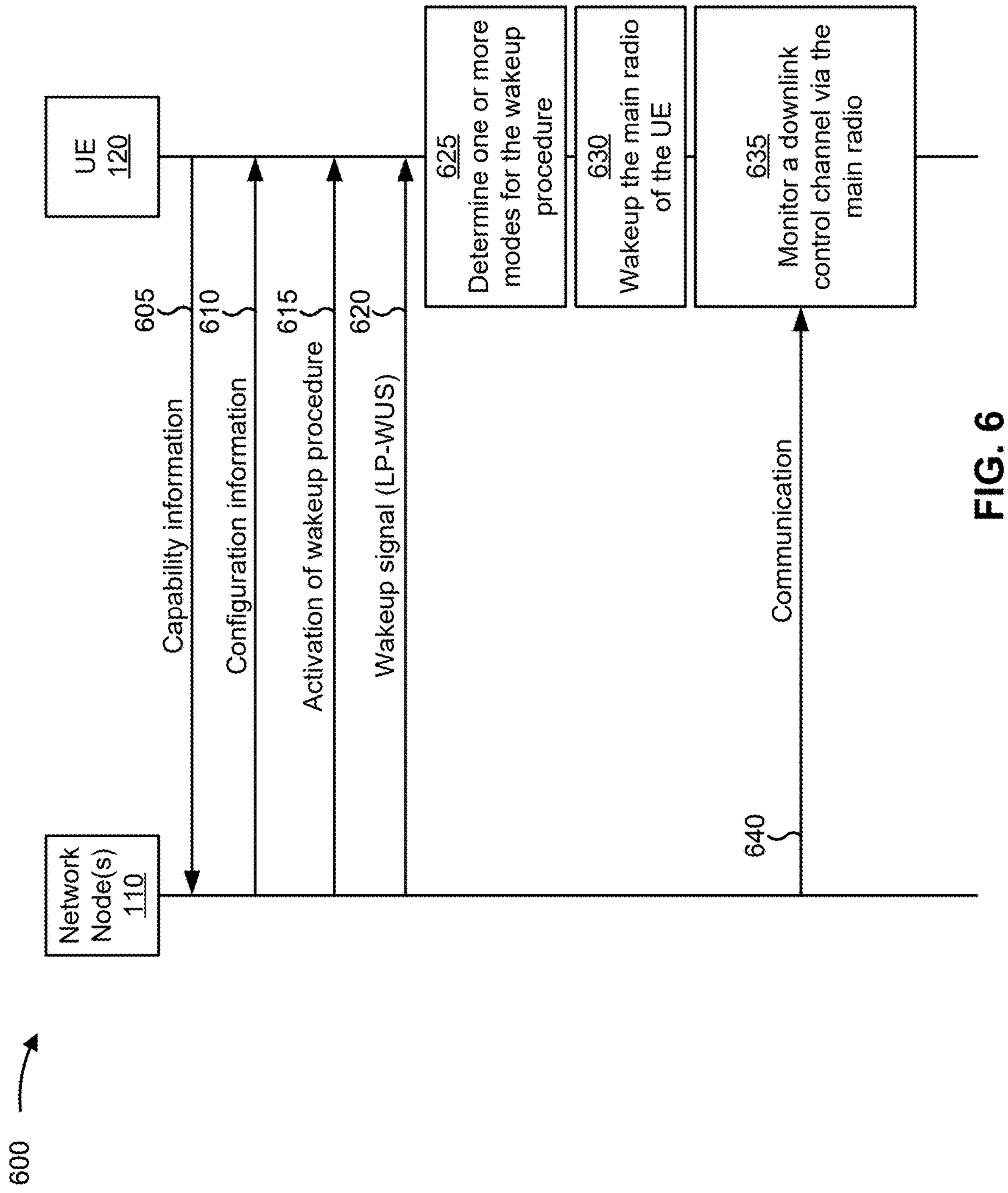
FIG. 6 is a diagram of an example associated with signaling for wakeup procedures, in accordance with the present disclosure.

FIG. 6 is a diagram of an example 600 associated with signaling for wakeup procedures, in accordance with the present disclosure. As shown in FIG. 6, a network node 110 (e.g., a base station, a CU, a DU, and/or an RU) may communicate with a UE 120. In some aspects, the network node 110 and the UE 120 may be part of a wireless network (e.g., the wireless communication network 100). The UE 120 and the network node 110 may have established a wireless connection prior to operations shown in FIG. 6. In some aspects, the UE 120 may include a main radio and a low-power radio (e.g., an LP-WUR), as described in more detail elsewhere herein.

In some aspects, as shown by reference number 605, the UE 120 may transmit, and the network node 110 may receive, capability information (e.g., a capability report). The UE 120 may transmit the capability information via an uplink communication, a UE assistance information (UAI) communication, a UCI communication, an uplink MAC-CE communication, an RRC communication, a PUCCH, and/or a PUSCH, among other examples. The capability information may indicate one or more parameters associated with respective capabilities of the UE 120. The one or more parameters may be indicated via respective information elements (IEs) included in the capability report.

For example, a capability report may indicate whether the UE 120 supports a feature and/or one or more parameters related to the feature. For example, the capability report may indicate a capability and/or parameter for one or more supported modes (e.g., one or more sleep mode and/or one or more wakeup modes) for a wakeup procedure. As another example, the capability report may indicate a capability and/or parameter for a main radio wakeup delay for one or more supported modes (e.g., one or more sleep mode and/or one or more wakeup modes) for the wakeup procedure. One or more operations described herein may be based on capability information of a capability report. For example, the UE 120 may perform a communication in accordance with the capability information, or may receive configuration information that is in accordance with the capability information.

In some aspects, the capability information may indicate one or more sleep modes supported by the UE 120. The one or more sleep modes may be associated with respective functionality and/or energy consumption levels for the main radio when the main radio is inactive, powered down, and/or "asleep," among other examples (e.g., when the UE is refraining from performing communication operations via the main radio). For example, the capability information may indicate whether the UE 120 supports an ultra-deep sleep mode, a deep sleep mode, a light sleep mode, and/or a micro sleep mode, among other examples. The different sleep modes may be associated with respective power consumption levels by the main radio during operations. For example, the ultra-deep sleep mode may be associated with a lowest power consumption level, the deep sleep mode may be associated with a next lowest power consumption level, the light sleep mode may be associated with a next lowest power consumption level, and so on.

As another example, the capability information may indicate one or more wakeup modes supported by the UE 120. The one or more wakeup modes may be associated with respective functionality and/or performance levels for the main radio when the main radio is active or "awake" (when the UE is performing communication operations via the main radio, such as monitoring a PDCCH). For example, in a first wakeup mode (e.g., a high quality mode, a high performance mode, or a high sensitivity mode), the main radio may be capable of receiving any type of signal from a network node. In a second wakeup mode (e.g., a low quality mode, a low performance mode, or a low sensitivity mode), the main radio may only be capable of receiving some types of signals from the network node, such as simple or low-complexity signals (e.g., DCI, such as DCI indicating PDCCH monitoring adaptation, such as PDCCH skipping). The second wakeup mode may be associated with a lower power consumption by the main radio as compared to the first wakeup mode. In other examples, there may be more than two supported wakeup modes.

Additionally, or alternatively, the capability information may indicate wakeup delays associated with respective modes from the one or more sleep modes or the one or more wakeup modes. For example, different modes (e.g., different sleep modes and/or different wakeup modes) may be associated with different amounts of time associated with the main radio transitioning out of that mode. As an example, a first sleep mode associated with lower energy consumption level may have a longer wakeup delay than a second sleep mode with a higher energy consumption level (e.g., because the first sleep mode may be associated with more components and/or functions of the main radio being powered off or unavailable as compared to the second sleep mode). As another example, a first wakeup mode (e.g., that is associated with a relatively higher performance level) may be associated with a longer wakeup delay than a second wakeup mode (e.g., that is associated with a relatively lower performance level). For example, the UE may need to tune or otherwise configure one or more RF front end components (such as an oscillator) to achieve the relatively higher performance level in order to operate in the first wakeup mode, resulting in a longer wakeup delay. The capability information may indicate amounts of times for respective wakeup delays of the one or more modes supported by the UE 120 for the wakeup procedure. In some aspects, the capability information may indicate multiple supported modes (e.g., multiple supported sleep modes and/or multiple supported wakeup modes) and/or multiple wakeup delays associated with the UE 120.

As shown by reference number 610, the network node 110 may transmit, and the UE 120 may receive, configuration information. In some aspects, the UE 120 may receive the configuration information via one or more of system information (e.g., a master information block (MIB) and/or a system information block (SIB), among other examples), RRC signaling, MAC signaling (e.g., one or more medium access control MAC-CEs), and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may indicate that the UE 120 is to perform the wakeup procedure (e.g., LP-WUS triggered PDCCH monitoring via the main radio of the UE 120). The configuration information may be based on the capability information. For example, the network node 110 may configure the UE 120 to operate using a mode (e.g., a sleep mode or a wakeup mode) that is supported by the UE 120 (e.g., as indicated by the capability information). Additionally, or alternatively, the network node 110 may configure monitoring occasions for LP-WUS monitoring that have a time gap between an on duration of a configured DRX cycle that is based on the wakeup delay for a mode in which the UE 120 is to operate for the wakeup procedure (e.g., where the time gap is determined based on the wakeup delay, such that the time gap is greater than the wakeup delay and within a certain amount of the wakeup delay so as to reduce the likelihood of the main radio operating in the wakeup mode for more time than is needed).

In some aspects, the configuration information may indicate one or more configured modes for the wakeup procedure. For example, the configuration information may indicate one or more configured sleep modes and/or one or more configured wakeup modes available to be used by the UE 120. The one or more configured modes may be based on the capability information. For example, the network node 110 may configure the UE 120 to use one or more modes from the supported modes indicated by the capability information. For example, the configuration information may configure multiple sleep modes for the UE 120 and may indicate the sleep mode that the UE 120 is to operate in when network node 110 activates the wakeup procedure (e.g., the LP-WUS triggered PDCCH monitoring). As another example, the configuration information may indicate one or more wakeup modes to be used by the UE 120 for the main radio when the main radio is in an active state. For example, the network node 110 may indicate which wakeup mode is to be used by the UE 120.

The configuration information may include a DRX configuration. For example, the configuration information may configure a DRX cycle (e.g., including one or more on durations and/or one or more inactive times). The configuration information may indicate an LP-WUS configuration. For example, the network node 110 may configure the UE 120 to monitor for LP-WUSs using the low-power radio (e.g., the LP-WUR) of the UE 120. The configuration information may configure one or more monitoring occasions to be used by the UE 120 to monitor for the LP-WUSs.

In some aspects, the configuration information may indicate different monitoring occasions for different modes (e.g., different wakeup modes and/or different sleep modes). For example, the configuration information may indicate one or more wakeup signal monitoring occasions (e.g., LP-WUS monitoring occasions) associated with respective configured sleep modes. Additionally, or alternatively, the configuration information may indicate one or more wakeup signal monitoring occasions (e.g., LP-WUS monitoring occasions) associated with respective configured wakeup modes.

The UE 120 may configure itself based at least in part on the configuration information. In some aspects, the UE 120 may be configured to perform one or more operations described herein based at least in part on the configuration information.

In some aspects, the configuration information described in connection with reference number 610 and/or the capability information described in connection with reference number 605 may include information transmitted via multiple communications. Additionally, or alternatively, the network node 110 may transmit the configuration information, or a communication including at least a portion of the configuration information, before and/or after the UE 120 transmits the capability information. For example, the network node 110 may transmit a first portion of the configuration information before the UE 120 transmits the capability information, the UE 120 may transmit at least a portion of the capability information, and the network node 110 may transmit a second portion of the configuration information after receiving the capability information.

As shown by reference number 615, the network node 110 may transmit, and the UE 120 may receive, one or more communications activating the wakeup procedure. For example, the network node 110 may transmit, and the UE 120 may receive, one or more communications activating PDCCH monitoring that is triggered by the reception of an LP-WUS. In some aspects, the one or more communication may indicate that DRX (e.g., connected mode DRX) is activated with LP-WUS triggered PDCCH monitoring. In some aspects, the one or more communications that activate the wakeup procedure may indicate one or more modes in which the UE 120 is to operate for the wakeup procedure (e.g., from the configured modes indicated by the configuration information). For example, the one or more communications that activate the wakeup procedure may indicate which sleep mode the main radio of the UE 120 to operate in while the main radio is asleep or inactive. Additionally, or alternatively, the one or more communications that activate the wakeup procedure may indicate a wakeup mode in which the main radio is to operate in while the main radio is active or turned on. The one or more communications that activate the wakeup procedure may be communicated via RRC signaling, MAC signaling, and/or DCI signaling, among other examples.

As shown by reference number 620, the network node 110 may transmit, and the UE 120 may receive, a wakeup signal (e.g., an LP-WUS). For example, the network node 110 may transmit the LP-WUS using resources associated with a configured monitoring occasion. The UE 120 may monitor the resources associated with the monitoring occasion via the low-power radio (e.g., the LP-WUR) of the UE 120. The UE 120 may receive the LP-WUS based on, or otherwise associated with, monitoring the resources associated with the monitoring occasion.

As shown by reference number 625, the UE 120 may determine one or more modes to operate in for the wakeup procedure. For example, the UE 120 may determine the one or more modes based on the configuration information (e.g., the configuration information may indicate which mode, such as which sleep mode and/or which wakeup mode, is to be used by the UE 120). In some aspects, the UE 120 may determine the one or more modes based on the activation of the wakeup procedure. Additionally, or alternatively, the UE 120 may determine the one or more modes based on the reception of the LP-WUS. The UE 120 may perform the wakeup procedure using the one or more determined modes. For example, the UE 120 may operate the main radio in accordance with the one or more modes. As an example, the UE 120 may operate the main radio in a determined sleep mode (e.g., when the main radio is inactive or otherwise in a sleep state) and/or may operate the main radio in a determined wakeup mode (e.g., when the main radio is active and/or is otherwise being used to transmit and/or receive signals).

For example, in some aspects, the LP-WUS may indicate which mode (e.g., which sleep mode and/or which wakeup mode) is to be used by the UE 120. For example, the LP-WUS may include information (e.g., one or more bits) that indicates the one or more modes. For example, the LP-WUS may indicate which wakeup mode the UE 120 is to transition the main radio to. Additionally, or alternatively, the LP-WUS may indicate which sleep mode the main radio is to be transitioned to after monitoring the PDCCH.

In some aspects, the UE 120 may determine the one or more modes based on a monitoring occasion during which (or in which) the LP-WUS is received by the UE 120. For example, a given monitoring occasion may be associated with a given mode, as indicated by the configuration information. The UE 120 may determine which monitoring occasion the LP-WUS was received in and may correlate the monitoring occasion to a mode (e.g., a wakeup mode and/or a sleep mode) in which the UE 120 is to operate. As another example, the UE 120 may determine the one or more modes based on an amount of time between the monitoring occasion and a next on duration for a configured DRX cycle. For example, the amount of time may be indicative of the mode (e.g., wakeup mode) in which the UE 120 is to transition to. For example, as described elsewhere herein, different wakeup modes may be associated with different wakeup delays. The UE 120 may associate the amount of time between the monitoring occasion and a next on duration to the wakeup delay and may determine an appropriate wakeup mode based on the amount of time (e.g., where the wakeup mode is associated with a wakeup delay that is less than the amount of time). If there are multiple wakeup modes associated with wakeup delays that are less than the amount of time, then the UE 120 may determine that the wakeup mode is the mode having a wakeup delay which is closest to the amount of time (e.g., without being greater than the amount of time). This may improve the power usage efficiency of the UE 120.

As shown by reference number 630, the UE 120 may wakeup the main radio of the UE 120 in accordance with the determined wakeup mode. For example, the UE 120 may power on one or more components of the main radio (e.g., one or more circuits, one or more modem components, and/or one or more RF front end components). Additionally, or alternatively, the UE 120 may configure and/or tune one or more components of the main radio to transition the main radio to the determined, indicated, and/or configured wakeup mode.

As shown by reference number 635, the UE 120 may monitor a downlink control channel (e.g., the PDCCH) via the main radio that is operating in the wakeup mode. For example, the UE 120 may monitor the PDCCH during an on duration of a configured DRX cycle. As shown by reference number 640, the network node 110 may transmit, and the UE 120 may receive, a communication via the PDCCH. Because the UE 120 is monitoring the PDCCH via the main radio, the UE 120 may be enabled to receive and/or decode the communication (e.g., during the on duration of the configured DRX cycle) via the main radio. For example, the communication may be a DCI communication. In some examples, the communication may indicate or activate a PDCCH monitoring adaptation operation for the UE 120, such as PDCCH skipping.

In some examples, by exchanging the capability information and the configuration information described herein, the UE 120 and the network node 110 may synchronize and coordinate the operations of the UE 120 for the wakeup procedure. For example, the network node 110 may configure the wakeup procedure and/or communicate with the UE 120 in accordance with the capabilities of the UE 120. This may enable the UE 120 to operate in different sleep modes and/or different wakeup modes without degrading communication performance or increasing latency for communications with the network node 110. By enabling the UE 120 to operate in different sleep modes and/or different wakeup modes, the described techniques can be used to provide flexibility for the UE 120 and/or the network node 110 to adapt the power saving operations of the UE 120 to different situations, thereby improving the power usage efficiency of the UE 120 while also not degrading communication performance or increasing latency for communications with the network node 110.

Additionally, by configuring one or more modes (e.g., in accordance with or based on the capability information) for the UE 120 and indicating which mode (e.g., a sleep mode or a wakeup mode) the UE is to operate in via the LP-WUS (e.g., received by the UE 120 as described in connection with reference number 620), the described techniques can be used to reducing a singling overhead and/or delay associated with the UE switching between different sleep modes and/or different wakeup modes.

As indicated above, FIG. 6 is provided as an example. Other examples may differ from what is described with respect to FIG. 6.

Figure 7:
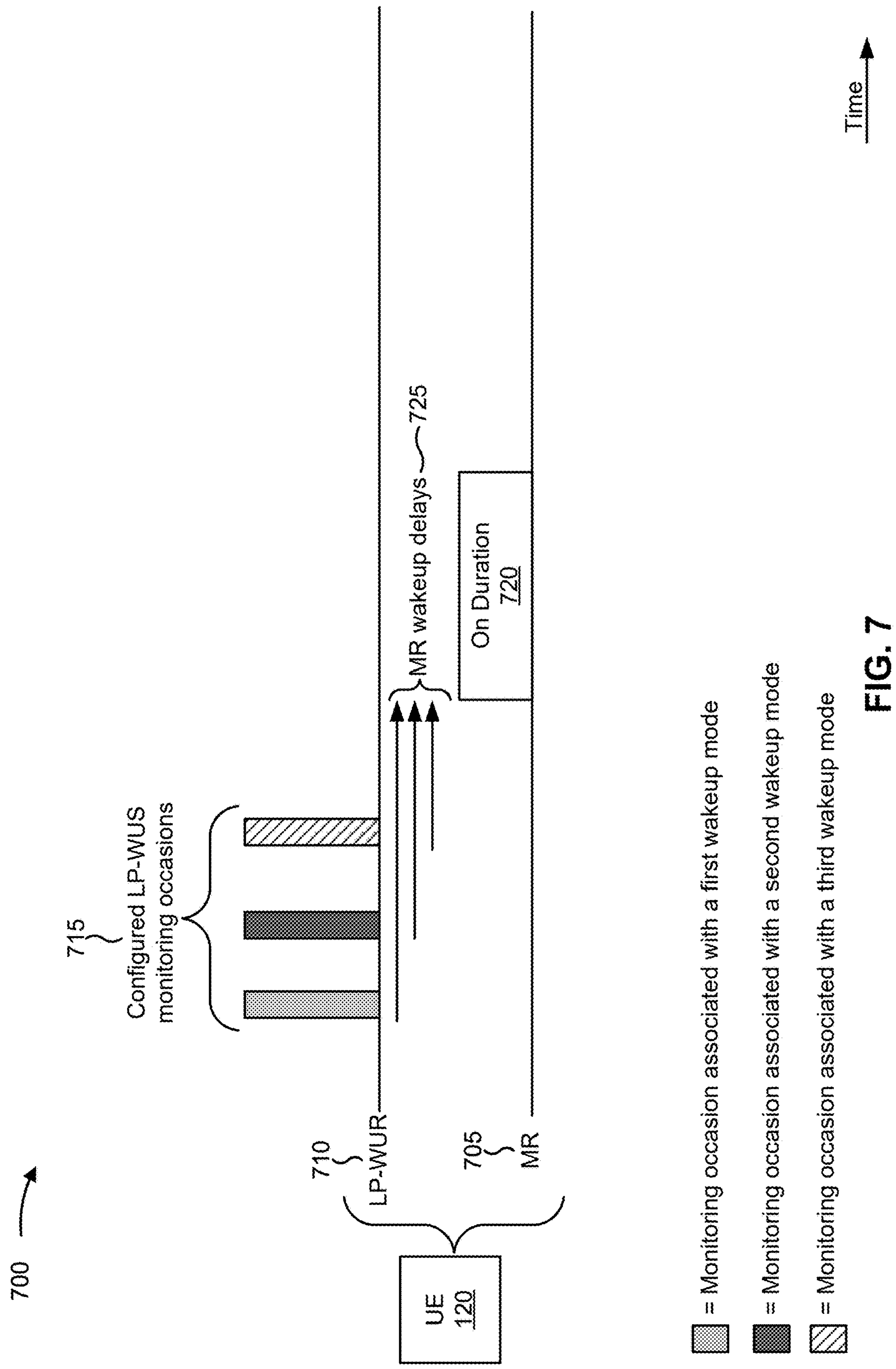
FIG. 7 is a diagram of an example associated with configured monitoring occasions for wakeup procedures, in accordance with the present disclosure.

FIG. 7 is a diagram of an example 700 associated with configured monitoring occasions for wakeup procedures, in accordance with the present disclosure. As shown in FIG. 7, the UE 120 may include a main radio 705 and a low-power radio (e.g., an LP-WUR 710), as described in more detail elsewhere herein.

As shown by reference number 715, the UE 120 may be configured with multiple monitoring occasions (e.g., for monitoring for an LP-WUS via the LP-WUR 710), such as by the configuration information described in connection with reference number 610. For example, the UE 120 may be configured with multiple monitoring occasions corresponding to (e.g., occurring slightly before in time) a DRX cycle. As shown in FIG. 7, the UE 120 may be configured with three monitoring occasions before a given on duration 720 of a configured DRX cycle.

The multiple monitoring occasions may be associated with different modes for a wakeup procedure of the main radio. For example, the multiple monitoring occasions may be associated with different wakeup modes and/or different sleep modes of the UE 120. For example, as shown in FIG. 7, a first monitoring occasion may be associated with a first wakeup mode, a second monitoring occasion may be associated with a second wakeup mode, and a third monitoring occasion may be associated with a third wakeup mode. Three wakeup modes are shown and described herein as an example and the aspects described herein may be similarly applied to other quantities of wakeup modes. Additionally, the aspects described herein may be similarly applied for sleep modes of the main radio 705. The UE 120 may monitor for LP-WUSs during each of the configured monitoring occasions shown by reference number 715 (e.g., via the LP-WUR 710).

The UE 120 may determine which wakeup mode in which the main radio 705 is to operate for the on duration 720 based on which monitoring occasion an LP-WUS is received during. For example, if the UE 120 receives and/or detects an LP-WUS during the first monitoring occasion, then the main radio 705 may operate in the first wakeup mode when monitoring the PDCCH during the on duration 720. If the UE 120 receives and/or detects an LP-WUS during the second monitoring occasion, then the main radio 705 may operate in the second wakeup mode when monitoring the PDCCH during the on duration 720. If the UE 120 receives and/or detects an LP-WUS during the third monitoring occasion, then the main radio 705 may operate in the third wakeup mode when monitoring the PDCCH during the on duration 720.

As another example, if the UE 120 misses an LP-WUS during a given monitoring occasion (e.g., if the UE 120 monitors for an LP-WUS and does not receive an LP-WUS), then the UE may switch the main radio 705 into a wakeup mode corresponding to the monitoring occasion in which the LP-WUS was missed. For example, if the UE 120 may receive an LP-WUS in the first monitoring occasions that indicates that the UE 120 does not need to wake up the main radio. The UE 120 may miss an LP-WUS during the second monitoring occasion. The UE 120 may switch the main radio 705 to the second wakeup mode based on missing the LP-WUS during the second monitoring occasion. In such examples, the UE 120 may not wake up the main radio 705 for the on duration 720, but may switch the wakeup mode used for the main radio 705 for future DRX cycles. This may enable the network node 110 to dynamically switch the wakeup mode used by the UE 120 without waking up the main radio 705 of the UE 120.

As shown by reference number 725, the different monitoring occasions may provide different main radio wakeup delays for the UE 120. For example, an amount of time between the different monitoring occasions and the on duration 720 may be different. The amount of time may be indicative of which wakeup mode is associated with which monitoring occasion. For example, a wakeup mode that is associated with a longer wakeup delay may be associated with a monitoring occasion with a greater amount of time before the on duration 720.

As indicated above, FIG. 7 is provided as an example. Other examples may differ from what is described with respect to FIG. 7.

Figure 8:
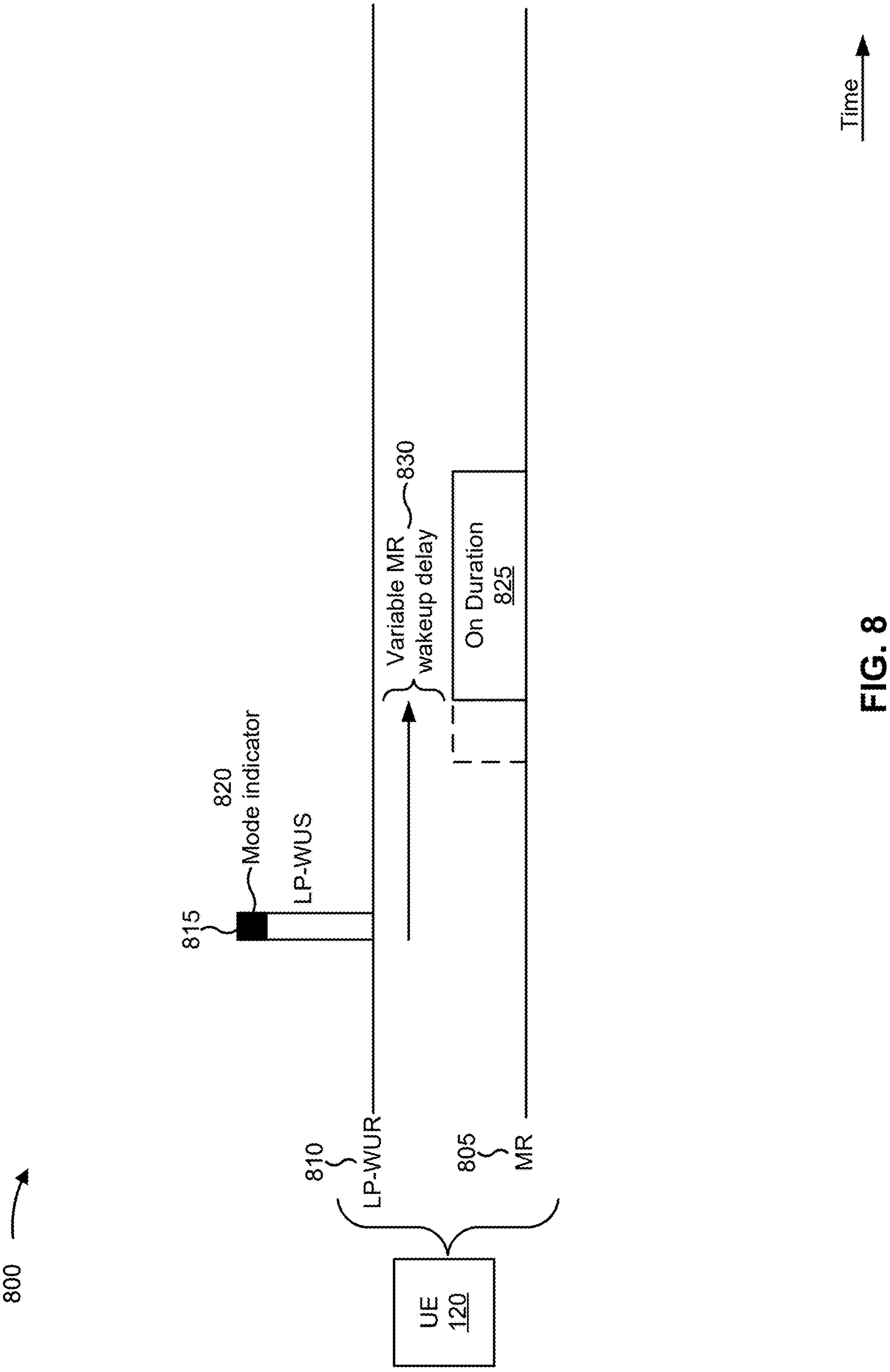
FIG. 8 is a diagram of an example associated with configured monitoring occasions for wakeup procedures, in accordance with the present disclosure.

FIG. 8 is a diagram of an example 800 associated with configured monitoring occasions for wakeup procedures, in accordance with the present disclosure. As shown in FIG. 8, the UE 120 may include a main radio 805 and a low-power radio (e.g., an LP-WUR 810), as described in more detail elsewhere herein.

The UE 120 may receive an LP-WUS 815 via the LP-WUR. For example, the UE 120 may receive the LP-WUS 815 during a configured monitoring occasion (e.g., for monitoring for an LP-WUS via the LP-WUR 810). As shown in FIG. 8, the LP-WUS 815 may include a mode indicator 820. The mode indicator 820 may indicate which mode (e.g., which sleep mode and/or which wakeup mode) the main radio 805 is to operate in for the wakeup procedure. For example, the UE 120 may monitor the PDCCH via the main radio 805 during an on duration 825 use a wakeup mode that is indicated by the mode indicator 820. As shown in FIG. 8, the wakeup procedure may be associated with a variable main radio wakeup delay 830. For example, depending on the wakeup mode indicated by the mode indicator 820, the main radio wakeup delay 830 may have different lengths.

As indicated above, FIG. 8 is provided as an example. Other examples may differ from what is described with respect to FIG. 8.

Figure 9:
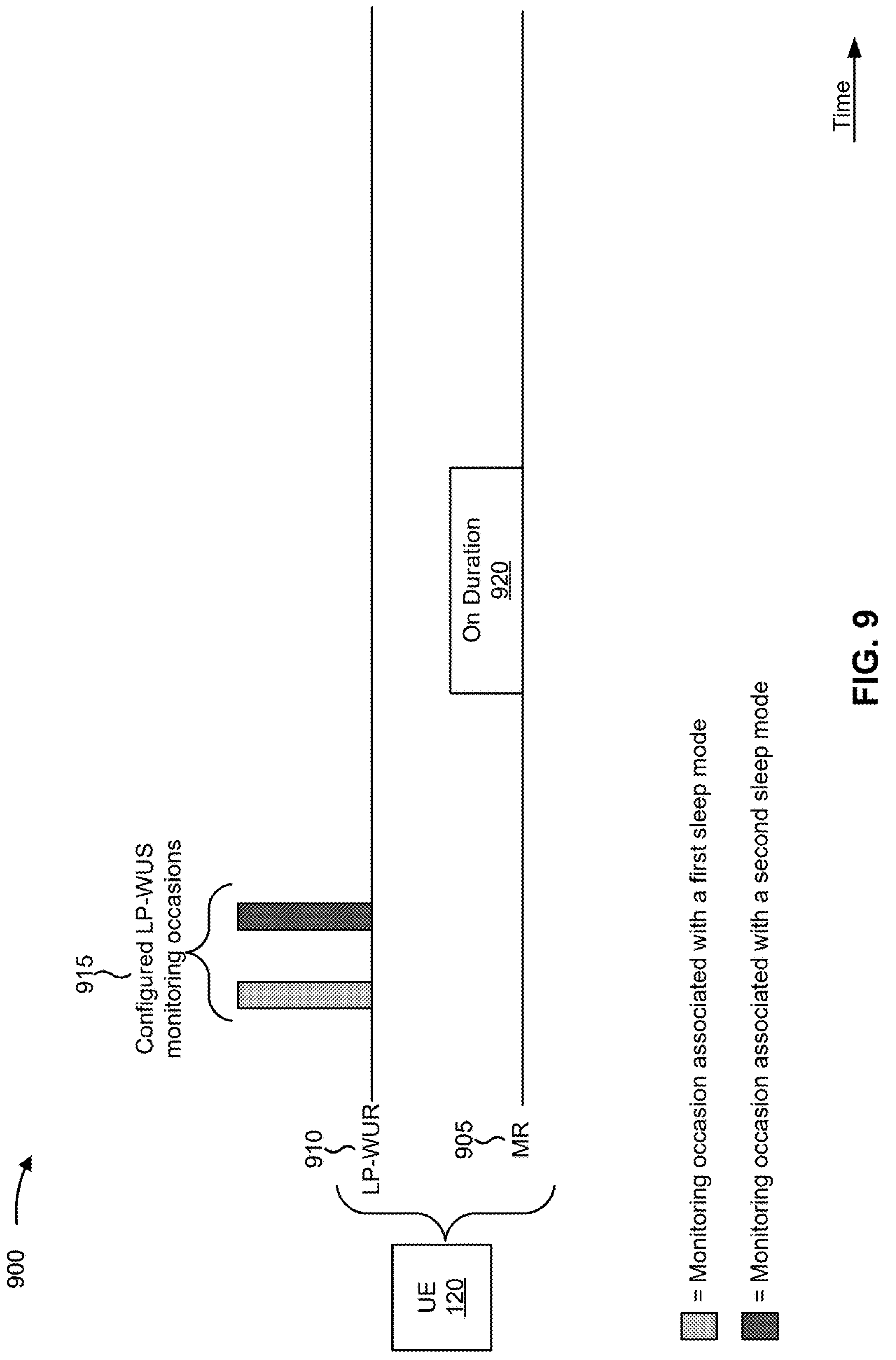
FIG. 9 is a diagram of an example associated with configured monitoring occasions for wakeup procedures, in accordance with the present disclosure.

FIG. 9 is a diagram of an example 900 associated with configured monitoring occasions for wakeup procedures, in accordance with the present disclosure. As shown in FIG. 9, the UE 120 may include a main radio 905 and a low-power radio (e.g., an LP-WUR 910), as described in more detail elsewhere herein.

As shown by reference number 915, the UE 120 may be configured with multiple monitoring occasions (e.g., for monitoring for an LP-WUS via the LP-WUR 910), such as by the configuration information described in connection with reference number 610. For example, the UE 120 may be configured with multiple monitoring occasions corresponding to (e.g., occurring slightly before in time) a DRX cycle. As shown in FIG. 9, the UE 120 may be configured with two monitoring occasions before a given on duration 920 of a configured DRX cycle.

The multiple monitoring occasions may be associated with different modes for a wakeup procedure of the main radio. For example, the multiple monitoring occasions may be associated with different wakeup modes and/or different sleep modes of the UE 120. For example, as shown in FIG. 9, a first monitoring occasion may be associated with a first sleep mode and a second monitoring occasion may be associated with a second sleep mode. Two sleep modes are shown and described herein as an example and the aspects described herein may be similarly applied to other quantities of sleep modes.

The UE 120 may monitor a monitoring occasion corresponding to a sleep mode in which the main radio 905 is operating. For example, if the UE 120 is indicated or configured to operate in the first sleep mode, then the UE 120 may monitor the first monitoring occasion for LP-WUSs via the LP-WUR. Alternatively, if the UE 120 is indicated or configured to operate in the second sleep mode, then the UE 120 may monitor the second monitoring occasion for LP-WUSs via the LP-WUR. In other words, the UE 120 may only monitor the resources associated with a monitoring occasion corresponding to the sleep mode in which the main radio 905 is operating.

As indicated above, FIG. 9 is provided as an example. Other examples may differ from what is described with respect to FIG. 9.

Figure 10:
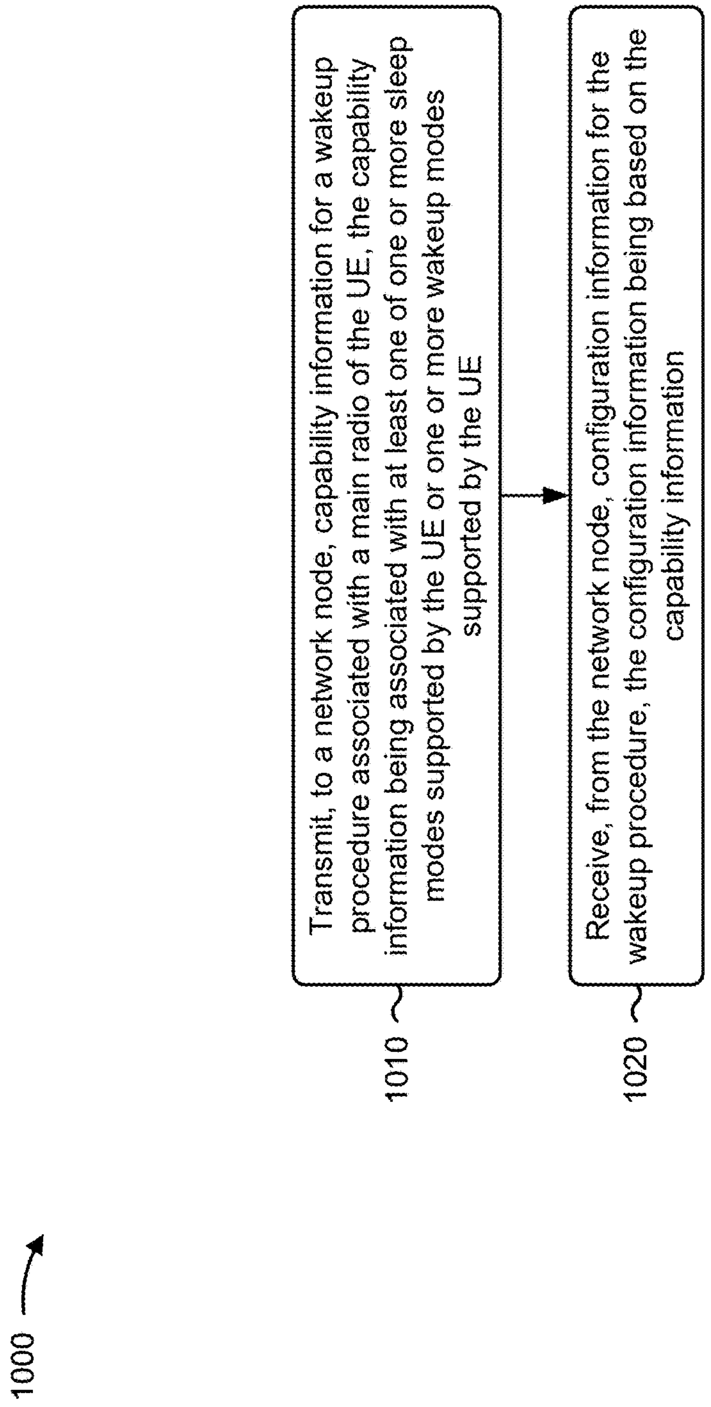
FIG. 10 is a diagram illustrating an example process performed, for example, at a UE or an apparatus of a UE, in accordance with the present disclosure.

FIG. 10 is a diagram illustrating an example process 1000 performed, for example, at a UE or an apparatus of a UE, in accordance with the present disclosure. Example process 1000 is an example where the apparatus or the UE (e.g., UE 120) performs operations associated with signaling for wakeup procedures.

As shown in FIG. 10, in some aspects, process 1000 may include transmitting, to a network node, capability information for a wakeup procedure associated with a main radio of the UE, the capability information being associated with at least one of one or more sleep modes supported by the UE or one or more wakeup modes supported by the UE (block 1010). For example, the UE (e.g., using communication manager 140 and/or transmission component 1204, depicted in FIG. 12) may transmit, to a network node, capability information for a wakeup procedure associated with a main radio of the UE, the capability information being associated with at least one of one or more sleep modes supported by the UE or one or more wakeup modes supported by the UE, as described above, for example, with reference to FIGS. 6, 7, 8, and/or 9.

As further shown in FIG. 10, in some aspects, process 1000 may include receiving, from the network node, configuration information for the wakeup procedure, the configuration information being based on the capability information (block 1020). For example, the UE (e.g., using communication manager 140 and/or reception component 1202, depicted in FIG. 12) may receive, from the network node, configuration information for the wakeup procedure, the configuration information being based on the capability information, as described above, for example, with reference to FIGS. 6, 7, 8, and/or 9.

Process 1000 may include additional aspects, such as any single aspect or any combination of aspects described below and/or in connection with one or more other processes described elsewhere herein.

In a first aspect, process 1000 includes receiving, via a low-power radio of the UE, a wakeup signal indicating that a downlink control channel is to be monitored by the UE via the main radio, receiving the wakeup signal is in accordance with the configuration information, and the wakeup signal is received while the main radio is in a sleep mode of the one or more sleep modes, and monitoring, via the main radio and based on receiving the wakeup signal, the downlink control channel in accordance with the configuration information.

In a second aspect, alone or in combination with the first aspect, the capability information indicates the one or more sleep modes supported by the UE.

In a third aspect, alone or in combination with one or more of the first and second aspects, the capability information indicates the one or more wakeup modes supported by the UE.

In a fourth aspect, alone or in combination with one or more of the first through third aspects, the capability information indicates wakeup delays associated with respective modes from the one or more sleep modes or the one or more wakeup modes.

In a fifth aspect, alone or in combination with one or more of the first through fourth aspects, the one or more sleep modes are associated with respective power consumption levels.

In a sixth aspect, alone or in combination with one or more of the first through fifth aspects, one or more modes, from the one or more sleep modes and the one or more wakeup modes, are associated with respective wakeup delays associated with the main radio.

In a seventh aspect, alone or in combination with one or more of the first through sixth aspects, the configuration information indicates one or more configured sleep modes based on the capability information.

In an eighth aspect, alone or in combination with one or more of the first through seventh aspects, process 1000 includes receiving, from the network node and via a low-power radio of the UE, a wakeup signal indicating a sleep mode, from the one or more configured sleep modes, to be used by the UE for the wakeup procedure.

In a ninth aspect, alone or in combination with one or more of the first through eighth aspects, the configuration information indicates one or more wakeup signal monitoring occasions associated with respective configured sleep modes.

In a tenth aspect, alone or in combination with one or more of the first through ninth aspects, process 1000 includes receiving, via a wakeup signal monitoring occasion of the one or more wakeup signal monitoring occasions, a wakeup signal, and performing the wakeup procedure using a configured sleep mode that is associated with the wakeup signal monitoring occasion as indicated by the configuration information.

In an eleventh aspect, alone or in combination with one or more of the first through tenth aspects, the configuration information indicates one or more wakeup signal monitoring occasions associated with respective configured wakeup modes.

In a twelfth aspect, alone or in combination with one or more of the first through eleventh aspects, process 1000 includes receiving, via a wakeup signal monitoring occasion of the one or more wakeup signal monitoring occasions, a wakeup signal, and performing the wakeup procedure using a configured wakeup mode that is associated with the wakeup signal monitoring occasion as indicated by the configuration information.

In a thirteenth aspect, alone or in combination with one or more of the first through twelfth aspects, process 1000 includes receiving, via a low-power radio of the UE, a wakeup signal indicating a wakeup delay, and performing the wakeup procedure using a configured wakeup mode or a configured sleep mode corresponding to the wakeup delay as indicated by the configuration information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
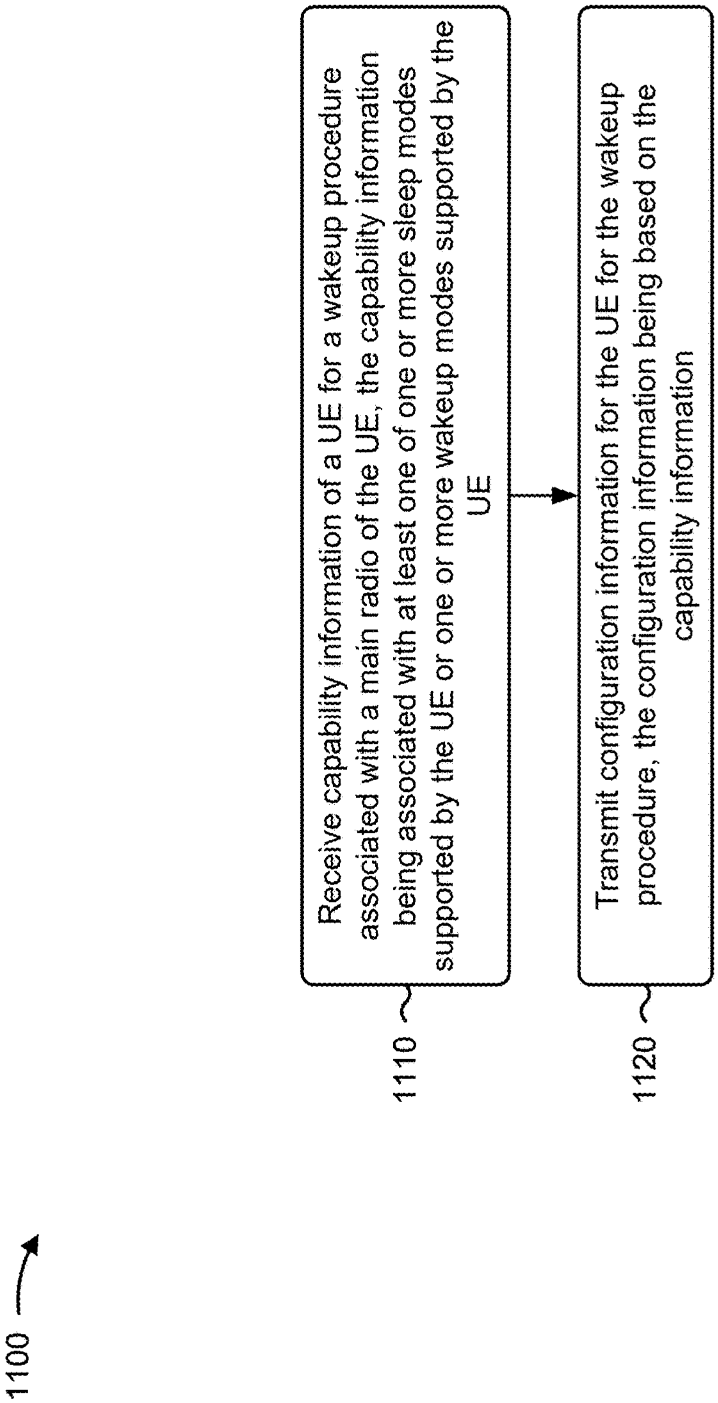
FIG. 11 is a diagram illustrating an example process performed, for example, at a network node or an apparatus of a network node, in accordance with the present disclosure.

FIG. 11 is a diagram illustrating an example process 1100 performed, for example, at a network node or an apparatus of a network node, in accordance with the present disclosure. Example process 1100 is an example where the apparatus or the network node (e.g., network node 110) performs operations associated with signaling for wakeup procedures.

As shown in FIG. 11, in some aspects, process 1100 may include receiving capability information of a UE for a wakeup procedure associated with a main radio of the UE, the capability information being associated with at least one of one or more sleep modes supported by the UE or one or more wakeup modes supported by the UE (block 1110). For example, the network node (e.g., using communication manager 150 and/or reception component 1302, depicted in FIG. 13) may receive capability information of a UE for a wakeup procedure associated with a main radio of the UE, the capability information being associated with at least one of one or more sleep modes supported by the UE or one or more wakeup modes supported by the UE, as described above, for example, with reference to FIGS. 6, 7, 8, and/or 9.

As further shown in FIG. 11, in some aspects, process 1100 may include transmitting configuration information for the UE for the wakeup procedure, the configuration information being based on the capability information (block 1120). For example, the network node (e.g., using communication manager 150 and/or transmission component 1304, depicted in FIG. 13) may transmit configuration information for the UE for the wakeup procedure, the configuration information being based on the capability information, as described above, for example, with reference to FIGS. 6, 7, 8, and/or 9.

Process 1100 may include additional aspects, such as any single aspect or any combination of aspects described below and/or in connection with one or more other processes described elsewhere herein.

In a first aspect, the capability information indicates the one or more sleep modes supported by the UE.

In a second aspect, alone or in combination with the first aspect, the capability information indicates the one or more wakeup modes supported by the UE.

In a third aspect, alone or in combination with one or more of the first and second aspects, the capability information indicates wakeup delays associated with respective modes from the one or more sleep modes or the one or more wakeup modes.

In a fourth aspect, alone or in combination with one or more of the first through third aspects, the one or more sleep modes are associated with respective power consumption levels.

In a fifth aspect, alone or in combination with one or more of the first through fourth aspects, one or more modes, from the one or more sleep modes and the one or more wakeup modes, are associated with respective wakeup delays associated with the main radio.

In a sixth aspect, alone or in combination with one or more of the first through fifth aspects, the configuration information indicates one or more configured sleep modes based on the capability information.

In a seventh aspect, alone or in combination with one or more of the first through sixth aspects, process 1100 includes transmitting a wakeup signal indicating a sleep mode, from the one or more configured sleep modes, to be used by the UE for the wakeup procedure.

In an eighth aspect, alone or in combination with one or more of the first through seventh aspects, the configuration information indicates one or more wakeup signal monitoring occasions associated with respective configured sleep modes.

In a ninth aspect, alone or in combination with one or more of the first through eighth aspects, process 1100 includes transmitting, via a wakeup signal monitoring occasion of the one or more wakeup signal monitoring occasions, a wakeup signal to indicate a configured sleep mode to be used by the UE, where the configured sleep mode that is associated with the wakeup signal monitoring occasion.

In a tenth aspect, alone or in combination with one or more of the first through ninth aspects, the configuration information indicates one or more wakeup signal monitoring occasions associated with respective configured wakeup modes.

In an eleventh aspect, alone or in combination with one or more of the first through tenth aspects, process 1100 includes transmitting, via a wakeup signal monitoring occasion of the one or more wakeup signal monitoring occasions, a wakeup signal to indicate a configured wakeup mode to be used by the UE, where the configured wakeup mode that is associated with the wakeup signal monitoring occasion.

In a twelfth aspect, alone or in combination with one or more of the first through eleventh aspects, process 1100 includes transmitting, a wakeup signal indicating a wakeup delay, where a configured wakeup mode or a configured sleep mode corresponds to the wakeup delay as indicated by the configuration information.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
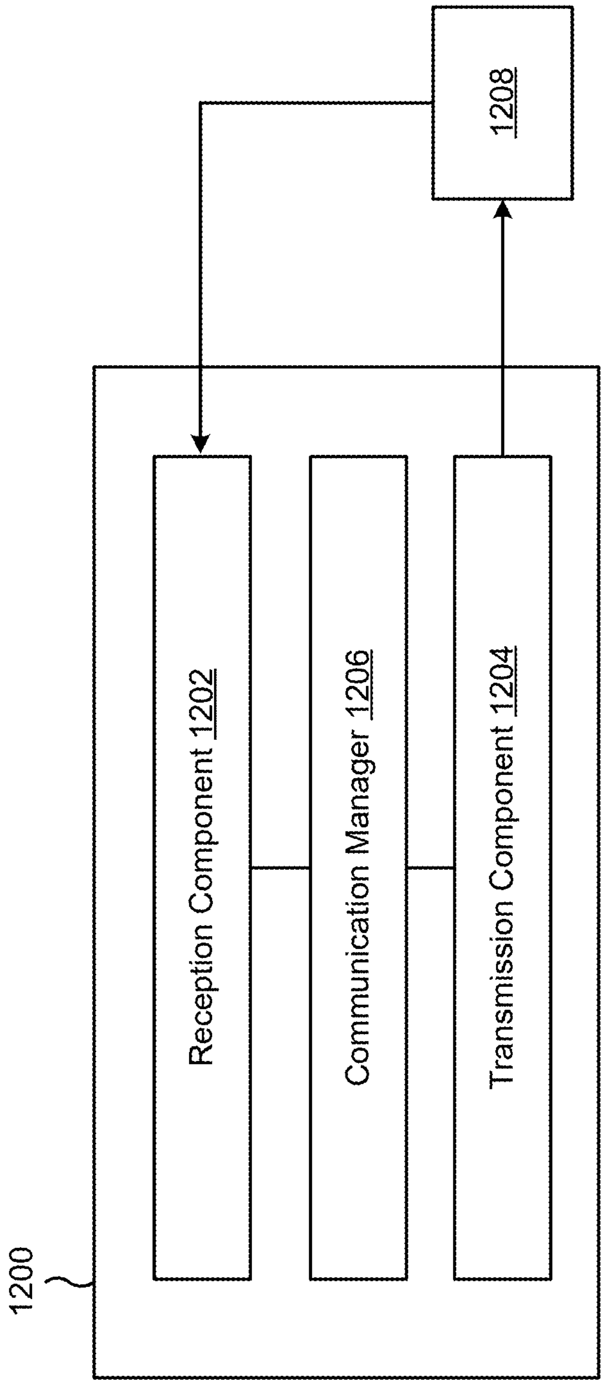
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 1204 may be co-located with the reception component 1202 in one or more transceivers.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a network node, capability information for a wakeup procedure associated with a main radio of the UE, the capability information being associated with at least one of one or more sleep modes supported by the UE or one or more wakeup modes supported by the UE. The reception component 1202 may receive, from the network node, configuration information for the wakeup procedure, the configuration information being based on the capability information.

The reception component 1202 may receive, via a low-power radio of the UE, a wakeup signal indicating that a downlink control channel is to be monitored by the UE via the main radio where receiving the wakeup signal is in accordance with the configuration information, and where the wakeup signal is received while the main radio is in a sleep mode of the one or more sleep modes.

The communication manager 1206 may monitor, via the main radio and based on receiving the wakeup signal, the downlink control channel in accordance with the configuration information.

The reception component 1202 may receive, from the network node and via a low-power radio of the UE, a wakeup signal indicating a sleep mode, from the one or more configured sleep modes, to be used by the UE for the wakeup procedure.

The reception component 1202 may receive, via a wakeup signal monitoring occasion of the one or more wakeup signal monitoring occasions, a wakeup signal.

The communication manager 1206 may perform the wakeup procedure using a configured sleep mode that is associated with the wakeup signal monitoring occasion as indicated by the configuration information.

The reception component 1202 may receive, via a wakeup signal monitoring occasion of the one or more wakeup signal monitoring occasions, a wakeup signal.

The communication manager 1206 may perform the wakeup procedure using a configured wakeup mode that is associated with the wakeup signal monitoring occasion as indicated by the configuration information.

The reception component 1202 may receive, via a low-power radio of the UE, a wakeup signal indicating a wakeup delay.

The communication manager 1206 may perform the wakeup procedure using a configured wakeup mode or a configured sleep mode corresponding to the wakeup delay as indicated by the configuration information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
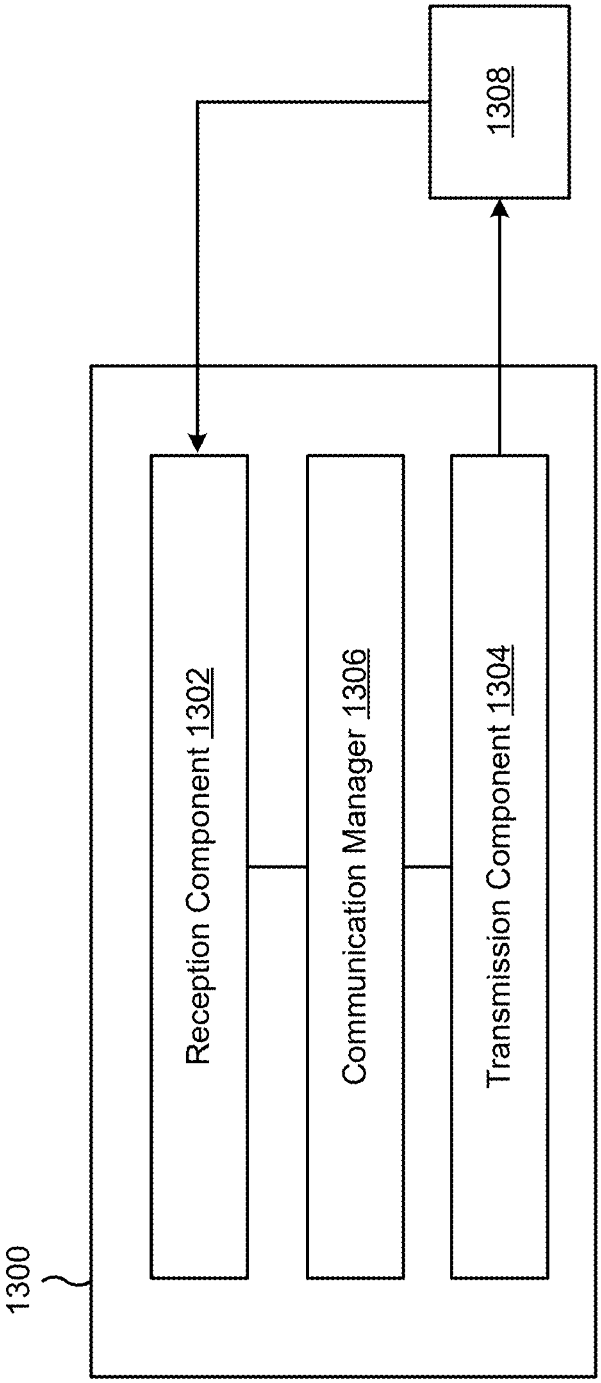
FIG. 13 is a diagram of an example apparatus for wireless communication, in accordance with the present disclosure.

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1304 may be co-located with the reception component 1302 in one or more transceivers.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The reception component 1302 may receive capability information of a UE for a wakeup procedure associated with a main radio of the UE, the capability information being associated with at least one of one or more sleep modes supported by the UE or one or more wakeup modes supported by the UE. The transmission component 1304 may transmit configuration information for the UE for the wakeup procedure, the configuration information being based on the capability information.

The transmission component 1304 may transmit a wakeup signal indicating a sleep mode, from the one or more configured sleep modes, to be used by the UE for the wakeup procedure.

The transmission component 1304 may transmit, via a wakeup signal monitoring occasion of the one or more wakeup signal monitoring occasions, a wakeup signal to indicate a configured sleep mode to be used by the UE, wherein the configured sleep mode that is associated with the wakeup signal monitoring occasion.

The transmission component 1304 may transmit, via a wakeup signal monitoring occasion of the one or more wakeup signal monitoring occasions, a wakeup signal to indicate a configured wakeup mode to be used by the UE, wherein the configured wakeup mode that is associated with the wakeup signal monitoring occasion.

The transmission component 1304 may transmit, a wakeup signal indicating a wakeup delay, wherein a configured wakeup mode or a configured sleep mode corresponds to the wakeup delay as indicated by the configuration information.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting, to a network node, capability information for a wakeup procedure associated with a main radio of the UE, the capability information being associated with at least one of one or more sleep modes supported by the UE or one or more wakeup modes supported by the UE; and receiving, from the network node, configuration information for the wakeup procedure, the configuration information being based on the capability information.

Aspect 2: The method of Aspect 1, further comprising: receiving, via a low-power radio of the UE, a wakeup signal indicating that a downlink control channel is to be monitored by the UE via the main radio, wherein receiving the wakeup signal is in accordance with the configuration information, and wherein the wakeup signal is received while the main radio is in a sleep mode of the one or more sleep modes; and monitoring, via the main radio and based on receiving the wakeup signal, the downlink control channel in accordance with the configuration information.

Aspect 3: The method of any of Aspects 1-2, wherein the capability information indicates the one or more sleep modes supported by the UE.

Aspect 4: The method of any of Aspects 1-3, wherein the capability information indicates the one or more wakeup modes supported by the UE.

Aspect 5: The method of any of Aspects 1-4, wherein the capability information indicates wakeup delays associated with respective modes from the one or more sleep modes or the one or more wakeup modes.

Aspect 6: The method of any of Aspects 1-5, wherein the one or more sleep modes are associated with respective power consumption levels.

Aspect 7: The method of any of Aspects 1-6, wherein one or more modes, from the one or more sleep modes and the one or more wakeup modes, are associated with respective wakeup delays associated with the main radio.

Aspect 8: The method of any of Aspects 1-7, wherein the configuration information indicates one or more configured sleep modes based on the capability information.

Aspect 9: The method of Aspect 8, further comprising: receiving, from the network node and via a low-power radio of the UE, a wakeup signal indicating a sleep mode, from the one or more configured sleep modes, to be used by the UE for the wakeup procedure.

Aspect 10: The method of any of Aspects 1-9, wherein the configuration information indicates one or more wakeup signal monitoring occasions associated with respective configured sleep modes.

Aspect 11: The method of Aspect 10, further comprising: receiving, via a wakeup signal monitoring occasion of the one or more wakeup signal monitoring occasions, a wakeup signal; and performing the wakeup procedure using a configured sleep mode that is associated with the wakeup signal monitoring occasion as indicated by the configuration information.

Aspect 12: The method of any of Aspects 1-11, wherein the configuration information indicates one or more wakeup signal monitoring occasions associated with respective configured wakeup modes.

Aspect 13: The method of Aspect 12, further comprising: receiving, via a wakeup signal monitoring occasion of the one or more wakeup signal monitoring occasions, a wakeup signal; and performing the wakeup procedure using a configured wakeup mode that is associated with the wakeup signal monitoring occasion as indicated by the configuration information.

Aspect 14: The method of any of Aspects 1-13, further comprising: receiving, via a low-power radio of the UE, a wakeup signal indicating a wakeup delay; and performing the wakeup procedure using a configured wakeup mode or a configured sleep mode corresponding to the wakeup delay as indicated by the configuration information.

Aspect 15: A method of wireless communication performed by a network node, comprising: receiving capability information of a user equipment (UE) for a wakeup procedure associated with a main radio of the UE, the capability information being associated with at least one of one or more sleep modes supported by the UE or one or more wakeup modes supported by the UE; and transmitting configuration information for the UE for the wakeup procedure, the configuration information being based on the capability information.

Aspect 16: The method of Aspect 15, wherein the capability information indicates the one or more sleep modes supported by the UE.

Aspect 17: The method of any of Aspects 15-16, wherein the capability information indicates the one or more wakeup modes supported by the UE.

Aspect 18: The method of any of Aspects 15-17, wherein the capability information indicates wakeup delays associated with respective modes from the one or more sleep modes or the one or more wakeup modes.

Aspect 19: The method of any of Aspects 15-18, wherein the one or more sleep modes are associated with respective power consumption levels.

Aspect 20: The method of any of Aspects 15-19, wherein one or more modes, from the one or more sleep modes and the one or more wakeup modes, are associated with respective wakeup delays associated with the main radio.

Aspect 21: The method of any of Aspects 15-20, wherein the configuration information indicates one or more configured sleep modes based on the capability information.

Aspect 22: The method of Aspect 21, further comprising: transmitting a wakeup signal indicating a sleep mode, from the one or more configured sleep modes, to be used by the UE for the wakeup procedure.

Aspect 23: The method of any of Aspects 15-22, wherein the configuration information indicates one or more wakeup signal monitoring occasions associated with respective configured sleep modes.

Aspect 24: The method of Aspect 23, further comprising: transmitting, via a wakeup signal monitoring occasion of the one or more wakeup signal monitoring occasions, a wakeup signal to indicate a configured sleep mode to be used by the UE, wherein the configured sleep mode that is associated with the wakeup signal monitoring occasion.

Aspect 25: The method of any of Aspects 15-24, wherein the configuration information indicates one or more wakeup signal monitoring occasions associated with respective configured wakeup modes.

Aspect 26: The method of Aspect 25, further comprising: transmitting, via a wakeup signal monitoring occasion of the one or more wakeup signal monitoring occasions, a wakeup signal to indicate a configured wakeup mode to be used by the UE, wherein the configured wakeup mode that is associated with the wakeup signal monitoring occasion.

Aspect 27: The method of any of Aspects 15-26, further comprising: transmitting, a wakeup signal indicating a wakeup delay, wherein a configured wakeup mode or a configured sleep mode corresponds to the wakeup delay as indicated by the configuration information.

Aspect 28: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-27.

Aspect 29: An apparatus for wireless communication at a device, the apparatus comprising one or more memories and one or more processors coupled to the one or more memories, the one or more processors configured to cause the device to perform the method of one or more of Aspects 1-27.

Aspect 30: An apparatus for wireless communication, the apparatus comprising at least one means for performing the method of one or more of Aspects 1-27.

Aspect 31: A non-transitory computer-readable medium storing code for wireless communication, the code comprising instructions executable by one or more processors to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

Aspect 33: A device for wireless communication, the device comprising a processing system that includes one or more processors and one or more memories coupled with the one or more processors, the processing system configured to cause the device to perform the method of one or more of Aspects 1-27.

Aspect 34: An apparatus for wireless communication at a device, the apparatus comprising one or more memories and one or more processors coupled to the one or more memories, the one or more processors individually or collectively configured to cause the device to perform the method of one or more of Aspects 1-27.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. A user equipment (UE) for wireless communication, comprising:

one or more memories; and one or more processors, coupled to the one or more memories, configured to cause the UE to:

transmit, to a network node, capability information for a wakeup procedure associated with a main radio of the UE, the capability information being associated with at least one of one or more sleep modes supported by the UE or one or more wakeup modes supported by the UE;

receive, from the network node, configuration information for the wakeup procedure, the configuration information being based on the capability information;

receive, via a low-power radio of the UE, a wakeup signal indicating that a downlink control channel is to be monitored by the UE via the main radio, wherein receiving the wakeup signal is in accordance with the configuration information, and wherein the wakeup signal is received while the main radio is in a sleep mode of the one or more sleep modes; and monitor, via the main radio and based on receiving the wakeup signal, the downlink control channel in accordance with the configuration information.

2. The UE of claim 1, wherein the capability information indicates the one or more sleep modes supported by the UE.

3. The UE of claim 1, wherein the capability information indicates the one or more wakeup modes supported by the UE.

4. The UE of claim 1, wherein the capability information indicates wakeup delays associated with respective modes from the one or more sleep modes or the one or more wakeup modes.

5. The UE of claim 1, wherein the one or more sleep modes are associated with respective power consumption levels.

6. The UE of claim 1, wherein one or more modes, from the one or more sleep modes and the one or more wakeup modes, are associated with respective wakeup delays associated with the main radio.

7. The UE of claim 1, wherein the configuration information indicates one or more configured sleep modes based on the capability information.

8. The UE of claim 7, wherein the one or more processors are further configured to cause the UE to:

receive, from the network node and via the low-power radio of the UE, the wakeup signal indicating a sleep mode, from the one or more configured sleep modes, to be used by the UE for the wakeup procedure.

9. A method of wireless communication performed by a user equipment (UE), comprising:

transmitting, to a network node, capability information for a wakeup procedure associated with a main radio of the UE, the capability information being associated with at least one of one or more sleep modes supported by the UE or one or more wakeup modes supported by the UE;

receiving, from the network node, configuration information for the wakeup procedure, the configuration information being based on the capability information;

receiving, via a low-power radio of the UE, a wakeup signal indicating that a downlink control channel is to be monitored by the UE via the main radio, wherein receiving the wakeup signal is in accordance with the configuration information, and wherein the wakeup signal is received while the main radio is in a sleep mode of the one or more sleep modes; and monitoring, via the main radio and based on receiving the wakeup signal, the downlink control channel in accordance with the configuration information.

10. The method of claim 9, wherein the configuration information indicates one or more wakeup signal monitoring occasions associated with respective configured sleep modes.

11. The method of claim 10, further comprising:

receiving, via a wakeup signal monitoring occasion of the one or more wakeup signal monitoring occasions, the wakeup signal; and performing the wakeup procedure using a configured sleep mode that is associated with the wakeup signal monitoring occasion as indicated by the configuration information.

12. The method of claim 9, wherein the configuration information indicates one or more wakeup signal monitoring occasions associated with respective configured wakeup modes.

13. The method of claim 12, further comprising:

receiving, via a wakeup signal monitoring occasion of the one or more wakeup signal monitoring occasions, the wakeup signal; and performing the wakeup procedure using a configured wakeup mode that is associated with the wakeup signal monitoring occasion as indicated by the configuration information.

14. The method of claim 9, further comprising:

receiving, via the low-power radio of the UE, the wakeup signal indicating a wakeup delay; and performing the wakeup procedure using a configured wakeup mode or a configured sleep mode corresponding to the wakeup delay as indicated by the configuration information.

15. A non-transitory computer-readable medium storing a set of instructions for wireless communication, the set of instructions comprising:

one or more instructions that, when executed by one or more processors of a user equipment (UE), cause the UE to:

transmit, to a network node, capability information for a wakeup procedure associated with a main radio of the UE, the capability information being associated with at least one of one or more sleep modes supported by the UE or one or more wakeup modes supported by the UE;

receive, from the network node, configuration information for the wakeup procedure, the configuration information being based on the capability information;

receive, via a low-power radio of the UE, a wakeup signal indicating that a downlink control channel is to be monitored by the UE via the main radio, wherein receiving the wakeup signal is in accordance with the configuration information, and wherein the wakeup signal is received while the main radio is in a sleep mode of the one or more sleep modes; and monitor, via the main radio and based on receiving the wakeup signal, the downlink control channel in accordance with the configuration information.

16. The non-transitory computer-readable medium of claim 15, wherein the capability information indicates the one or more sleep modes supported by the UE.

17. The non-transitory computer-readable medium of claim 15, wherein the capability information indicates the one or more wakeup modes supported by the UE.

18. The non-transitory computer-readable medium of claim 15, wherein the capability information indicates wakeup delays associated with respective modes from the one or more sleep modes or the one or more wakeup modes.

19. The non-transitory computer-readable medium of claim 15, wherein the one or more sleep modes are associated with respective power consumption levels.

20. The non-transitory computer-readable medium of claim 15, wherein one or more modes, from the one or more sleep modes and the one or more wakeup modes, are associated with respective wakeup delays associated with the main radio.

* * * * *